US012794936B2

(12) United States Patent
Zafar

(10) Patent No.: US 12,794,936 B2
(45) Date of Patent: *Nov. 10, 2026

(54) SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM

(71) Applicant: Expel, Inc., Herndon, VA (US)

(72) Inventor: Nabeel Zafar, Alexandria, VA (US)

(73) Assignee: Expel, Inc., Herndon, VA (US)

( * ) Notice: Subject to any disclaimer, the term of this patent is extended or adjusted under 35 U.S.C. 154(b) by 1 day.

This patent is subject to a terminal disclaimer.

(21) Appl. No.: 19/185,816

(22) Filed: Apr. 22, 2025

(65) Prior Publication Data

US 2025/0254192 A1 Aug. 7, 2025

Related U.S. Application Data

(63) Continuation of application No. 18/592,069, filed on Feb. 29, 2024, now Pat. No. 12,309,193, which is a (Continued)

(51) Int. Cl.
*H04L 9/40* (2022.01)
*G06F 9/54* (2006.01)

(52) U.S. Cl.
CPC .......... *H04L 63/1441* (2013.01); *G06F 9/547* (2013.01); *H04L 63/1416* (2013.01)

(58) Field of Classification Search
CPC .. H04L 63/1441; H04L 63/1416; G06F 9/547
(Continued)

(56) References Cited

U.S. PATENT DOCUMENTS 8,255,996 B2 * 8/2012 Elrod .................. H04L 63/0227 370/395.54
10,749,890 B1 * 8/2020 Aloisio ................. H04L 63/302
(Continued)

*Primary Examiner* — Badrinarayanan
(74) *Attorney, Agent, or Firm* — Padowithz Alce; Chandler Scheitlin; Alce PLLC

(57) ABSTRACT

A system and method for accelerating a threat mitigation of malicious cybersecurity activity includes: identifying, via one or more processors, a cybersecurity event associated with a third-party application or a third-party service of a subscriber; generating, via the one or more processors, a service-proposed remediation action for the cybersecurity event based on the identifying of the cybersecurity event; automatically assessing, via the one or more processors, the service-proposed remediation action against automated remediation criteria of the subscriber based on the generation of the service-proposed remediation action; automatically constructing, via the one or more processors, a remediation action application programming interface (API) request for the service-proposed remediation action based on the service-proposed remediation action satisfying the automated remediation criteria of the subscriber; and automatically executing, via the one or more processors, the remediation action API request to remediation or mitigate a suspected cybersecurity threat associated with the cybersecurity event.

7 Claims, 18 Drawing Sheets

100

Related U.S. Application Data continuation of application No. 18/376,630, filed on Oct. 4, 2023, now Pat. No. 11,949,708, which is a continuation of application No. 18/123,137, filed on Mar. 17, 2023, now Pat. No. 11,811,819.

(60) Provisional application No. 63/338,832, filed on May 5, 2022, provisional application No. 63/321,601, filed on Mar. 18, 2022.

(58) Field of Classification Search
USPC .............................................................. 726/23
See application file for complete search history.

(56) References Cited

U.S. PATENT DOCUMENTS

| | | | | |
|---|---|---|---|---|
| 11,128,654 | B1 * | 9/2021 | Joyce | G06F 16/955 |
| 11,303,666 | B1 * | 4/2022 | Peters | H04L 63/1441 |
| 2012/0324242 | A1 * | 12/2012 | Kirsch | G06F 21/6245<br>713/189 |
| 2014/0201836 | A1 * | 7/2014 | Amsler | H04L 63/20<br>726/23 |
| 2015/0242637 | A1 * | 8/2015 | Tonn | H04L 63/1441<br>726/25 |
| 2019/0028509 | A1 * | 1/2019 | Cidon | H04L 63/1425 |
| 2020/0285737 | A1 * | 9/2020 | Kraus | G06F 21/552 |
| 2021/0176257 | A1 * | 6/2021 | Yavo | H04L 63/02 |
| 2021/0273961 | A1 * | 9/2021 | Humphrey | H04L 63/1416 |

* cited by examiner

SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM

CROSS-REFERENCE TO RELATED APPLICATIONS

This application is continuation of U.S. patent application Ser. No. 18/592,069, filed 29 Feb. 2024, which is a continuation of U.S. Pat. No. 11,949,708, filed 4 Oct. 2023, which is a continuation of U.S. Pat. No. 11,811,819, filed 17 Mar. 2023, which claims the benefit of U.S. Provisional Application No. 63/338,832, filed 5 May 2022 and U.S. Provisional Application No. 63/321,601, filed 18 Mar. 2022, which are incorporated in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to use managed security providers to combat cybersecurity attacks occurring via various attack vectors (e.g., phishing, business email compromise, etc.), the added complexity of migrating part of their computing resources and computing requirements to cloud-based services have increased the security threats posed by malicious actors.

Thus, security operation services may be tasked with mirroring the growth of these security threats and correspondingly, scaling their security services to adequately protect the computing and other digital assets of a subscribing organizational entity. However, because the volume of security threats and the speed at which threats need to be mitigated grows, it may present one or more technical challenges in scaling security operations services without resulting in a number of technical inefficiencies that may prevent or slowdown the detection of security threats and efficiently responding to detected security threats.

Accordingly, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE INVENTION(S)

In one embodiment, a computer-implemented method for accelerating a threat mitigation of malicious cybersecurity activity via a cybersecurity event detection and response service, the computer-implemented method comprising: identifying a cybersecurity event associated with a third-party security application or a third-party security service of a subscriber; generating a service-proposed threat mitigation action for the cybersecurity event based on identifying that the cybersecurity event corresponds to malicious activity, wherein the service-proposed threat mitigation action includes (i) a threat mitigation action type and (ii) a compromised digital asset associated with the cybersecurity event; automatically assessing the service-proposed threat mitigation action against automated mitigation criteria of the subscriber based on the generation of the service-proposed threat mitigation action, wherein the automatic assessing confirms or disconfirms that the threat mitigation action type and the compromised digital asset satisfies the automated mitigation criteria of the subscriber; automatically constructing a compromised asset application programming interface (API) request for the service-proposed threat mitigation action based on confirming that the threat mitigation action type and the compromised digital asset satisfies the automated mitigation criteria of the subscriber, wherein the automatic construction of the compromised asset API request includes: (a) identifying a security device associated with an origin source of the cybersecurity event; and (b) encoding the compromised asset API request based on API definitions and protocols of the security device that corresponds to the threat mitigation action type; and automatically executing the compromised asset API request that resolves or mitigates a cybersecurity threat associated with the compromised digital asset.

In one embodiment, the computer-implemented includes wherein: the threat mitigation action type of the service-proposed threat mitigation action relates to terminating existing network connections with a target compromised network host and preventing new network connections from digitally communicating with the target compromised network host; the compromised digital asset of the service-proposed threat mitigation action includes a compromised network host of the subscriber; constructing the compromised asset API request includes encoding a payload component of the compromised asset API request to include the compromised network host of the subscriber; and the compromised asset API request, when executed, automatically terminates existing network connections on the compromised network host and prevents new network connections from digitally communicating with the compromised network host of the subscriber.

In one embodiment, the computer-implemented includes wherein: the threat mitigation action type of the service-proposed threat mitigation action relates to temporarily or permanently disabling a target compromised user account to prevent unauthorized access to a target computing environment of a target subscriber; the compromised digital asset of the service-proposed threat mitigation action includes a compromised user account of the subscriber; constructing the compromised asset API request includes encoding a payload component of the compromised asset API request to include the compromised user account of the subscriber; and the compromised asset API request, when executed, automatically disables the compromised user account of the subscriber.

In one embodiment, the computer-implemented includes wherein: the threat mitigation action type of the service-proposed threat mitigation action relates to terminating a target cloud computing environment of a target subscriber; the compromised digital asset of the service-proposed threat mitigation action includes a compromised cloud computing environment of the subscriber; constructing the compromised asset API request includes encoding a payload component of the compromised asset API request to include the compromised cloud computing environment of the subscriber; and the compromised asset API request, when executed, automatically suspends or automatically ceases digital events from occurring on the compromised cloud computing environment of the subscriber.

In one embodiment, the computer-implemented includes wherein: the threat mitigation action type of the service-proposed threat mitigation action relates to disabling or modifying a target compromised cloud access key of a target subscriber; the compromised digital asset of the service-proposed threat mitigation action includes a compromised access key of the subscriber; constructing the compromised asset API request includes encoding a payload component of the compromised asset API request to include the compromised cloud access key of the subscriber; and the compromised asset API request, when executed, automatically disables or automatically modifies the compromised access key of the subscriber.

In one embodiment, the computer-implemented further includes enrolling the subscriber into a plurality of distinct automated mitigation action types of the cybersecurity event detection and response service based on receiving one or more automated mitigation enrollment requests from the subscriber; for each distinct automated mitigation action type of the plurality of distinct automated mitigation action types: obtaining, from the subscriber, one of: a distinct corpus of authorized digital assets on which the subscriber permits or authorizes the cybersecurity event detection and response service to execute automated mitigations actions for a target automated mitigation action type; and a distinct corpus of prohibited digital assets on which the subscriber prohibits the cybersecurity event detection and response service to execute automated mitigations actions for the target automated mitigation action type; and generating, via one or more processors, a subscriber-specific mitigation context data structure for the target automated mitigation action type based on the authorized corpus of subscriber-specific digital assets or the prohibited corpus of subscriber-specific digital assets.

In one embodiment, the computer-implemented includes wherein the threat mitigation action type of the service-proposed threat mitigation action corresponds to one of the plurality of distinct automated mitigation action types; automatically assessing the service-proposed threat mitigation action against automated mitigation criteria of the subscriber further includes: confirming or disconfirming that the threat mitigation action type of the service-proposed threat mitigation action digitally maps to the one of the plurality of distinct automated mitigation action types; and confirming or disconfirming that the compromised digital asset relates to a mitigation-permitted digital asset based on an automatic evaluation of a subscriber-specific mitigation context corpus that corresponds to the one of the plurality of distinct automated mitigation action types.

In one embodiment, the computer-implemented includes wherein automatically constructing the compromised asset API request is further based on: confirming that the threat mitigation action type of the service-proposed threat mitigation action digitally maps to the one of the plurality of distinct automated mitigation action types; and confirming that the compromised digital asset relates to the mitigation-permitted digital asset based on the automatic evaluation.

In one embodiment, the computer-implemented includes wherein identifying the API definitions and protocols of the security device includes: accessing, via the one or more processors, an API-based reference mapping data structure between each of the plurality of distinct automated mitigation action types of the cybersecurity event detection and response service and a plurality of distinct security device-specific API definitions and protocols; obtaining, via the one or more processors, the API definitions and protocols of the security device based on evaluating the security device of the cybersecurity event and the threat mitigation action type of the service-proposed threat mitigation action against the API-based reference mapping data structure.

In one embodiment, the computer-implemented includes wherein identifying the API definitions and protocols of the security device includes: accessing, via the one or more processors, an API-based reference mapping data structure between each of the plurality of distinct automated mitigation action types of the cybersecurity event detection and response service and a plurality of distinct security device-specific API definitions and protocols; receiving, via the one or more processors, the API definitions and protocols of the security device based on performing a search of the API-based reference mapping data structure using the security device of the cybersecurity event and the threat mitigation action type of the service-proposed threat mitigation action as search parameters.

In one embodiment, a computer-implemented method for accelerating a threat mitigation of malicious cybersecurity activity via a cybersecurity event detection and response service, the computer-implemented method comprising: identifying, via one or more processors, a cybersecurity event associated with a third-party application or a third-party service of a subscriber; generating, via the one or more processors, a service-proposed remediation action for the cybersecurity event based on the identifying of the cybersecurity event; automatically assessing, via the one or more processors, the service-proposed remediation action against automated remediation criteria of the subscriber based on the generation of the service-proposed remediation action; automatically constructing, via the one or more processors, a remediation action application programming interface (API) request for the service-proposed remediation action based on the service-proposed remediation action satisfying the automated remediation criteria of the subscriber; and automatically executing, via the one or more processors, the remediation action API request to remediation or mitigate a suspected cybersecurity threat associated with the cybersecurity event.

In one embodiment, the computer-implemented further includes automatically computing, via the one or more processors, a probable cybersecurity threat type of the cybersecurity event; and automatically generating, via the one or more processors, the service-proposed remediation action for the cybersecurity event based on the probable cybersecurity threat type.

In one embodiment, the computer-implemented further includes a cybersecurity threat severity level computed for the cybersecurity event exceeds a subscriber-defined cybersecurity threat severity threshold; and the computer-implemented method further includes automatically generating, via the one or more processors, the service-proposed remediation action for the cybersecurity event based on a likely cybersecurity threat type of the cybersecurity event.

In one embodiment, the computer-implemented further includes automatically identifying, via the one or more processors, that the cybersecurity event includes a critical computing asset or a critical digital asset of the subscriber; and the computer-implemented method further includes:

automatically generating, via the one or more processors, the service-proposed remediation action for the cybersecurity event based on the identifying.

In one embodiment, the computer-implemented further includes automatically generating, via the one or more processors, a remediation action reversal API request based on identifying that the cybersecurity event relates to a valid cybersecurity event or a non-malicious cybersecurity event; and executing, via the one or more processors, the remediation action reversal API request that, when executed, reverses a result or outcome of the execution of the remediation action API request.

In one embodiment, the computer-implemented further includes wherein a remediation action type of the service-proposed remediation action relates to deleting or removing a target malicious electronic communication from a majority of the electronic messaging accounts associated with a target subscriber; the service-proposed threat remediation action includes a malicious electronic communication identified during a cybersecurity investigation of the cybersecurity event; constructing the remediation action API request includes encoding a payload component of the remediation action API request to include a representation of the malicious electronic communication of the subscriber; and the remediation action API request, when executed, automatically deletes or automatically removes the malicious electronic communication from a majority of the electronic messaging accounts associated with the subscriber of the cybersecurity event.

In one embodiment, the computer-implemented further includes wherein a remediation action type of the service-proposed remediation action relates to blocking a target domain or internet protocol address corresponding to a target command-and-control communication; the service-proposed remediation action includes a command-and-control communication identified during a cybersecurity investigation of the cybersecurity event; and the remediation action API request, when executed, automatically blocks, for the subscriber, one or more internet protocol addresses or one or more domains associated with the command-and-control communication.

In one embodiment, the computer-implemented further includes wherein a remediation action type of the service-proposed remediation action relates to preventing a target malicious application associated with a target malicious hash signature from executing on a target digital environment of a target subscriber; the service-proposed remediation action includes a malicious hash signature identified during a cybersecurity investigation of the cybersecurity event; constructing the remediation action API request for the service-proposed remediation action includes encoding a payload component of the remediation action API request to include the malicious hash signature; and the remediation action API request, when executed, automatically blocks the malicious hash signature for the subscriber.

In one embodiment, the computer-implemented further includes displaying, via one or more processors, an automated mitigations user interface that graphically displays a plurality of distinct automated mitigation action types of the cybersecurity event detection and response service; while displaying the automated mitigations user interface: automatically enrolling, via the one or more processors, the subscriber to a first distinct automated mitigation action type of the plurality of distinct automated mitigation action types based on the subscriber selecting an automated enrollment user interface object that corresponds to the first distinct automated mitigation action type; automatically enrolling, via the one or more processors, the subscriber to a second distinct automated mitigation action type of the plurality of distinct automated mitigation action types based on the subscriber selecting an automated enrollment user interface object that corresponds to the second distinct automated mitigation action type; obtaining, from the subscriber, one of: one or more authorized subscriber-specific digital assets on which the subscriber authorizes the cybersecurity event detection and response service to execute automated mitigations actions for the first distinct automated mitigation action type based on receiving one or more inputs from the subscriber; and one or more prohibited subscriber-specific digital assets on which the subscriber prohibits the cybersecurity event detection and response service to execute automated mitigations actions for the first distinct automated mitigation action type based on receiving one or more inputs from the subscriber; and generating, via the one or more processors, a subscriber-specific remediation context data structure for the first distinct automated mitigation action type based on the one or more authorized subscriber-specific digital assets or the one or more prohibited subscriber-specific digital assets.

In one embodiment, the computer-implemented further includes in response to generating the service-proposed remediation action for the cybersecurity event: automatically generating, via the one or more processors, a cybersecurity event-specific reporting artifact that includes a remediation-based graphical user interface object, wherein the remediation-based graphical user interface object corresponds to the service-proposed remediation action; and installing, via the one or more processors a remediation status of the remediation action API request into a target portion of the remediation-based graphical user interface object based on an outcome or result of the executing of the remediation action API request.

In one embodiment, the computer-implemented method includes displaying, via one or more processors, a subscriber enrollment interface that graphically displays a plurality of distinct automated mitigation action types provided by the cybersecurity event detection and response service; receiving, via the one or more processors, a subscriber enrollment request for one of the plurality of distinct automated mitigation action types provided by the cybersecurity event detection and response service; and in response to receiving the subscriber enrollment request, automatically enrolling the subscriber into the one of the plurality of distinct automated mitigation action types.

In one embodiment, the computer-implemented method includes while displaying the automated mitigations user interface: obtaining from the subscriber: an authorized corpus of subscriber-specific digital assets that the subscriber authorizes the cybersecurity event detection and response service to execute automated mitigations actions on for the first distinct automated mitigation action type based on receiving one or more inputs from the subscriber; and a prohibited corpus of subscriber-specific digital assets that the subscriber prohibits the cybersecurity event detection and response service to execute automated mitigations actions on for the first distinct automated mitigation action type based on receiving one or more inputs from the subscriber; and generating, via the one or more processors, a subscriber-specific mitigation context data structure for the first distinct automated mitigation action type based on the authorized corpus of subscriber-specific digital assets and the prohibited corpus of subscriber-specific digital assets.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
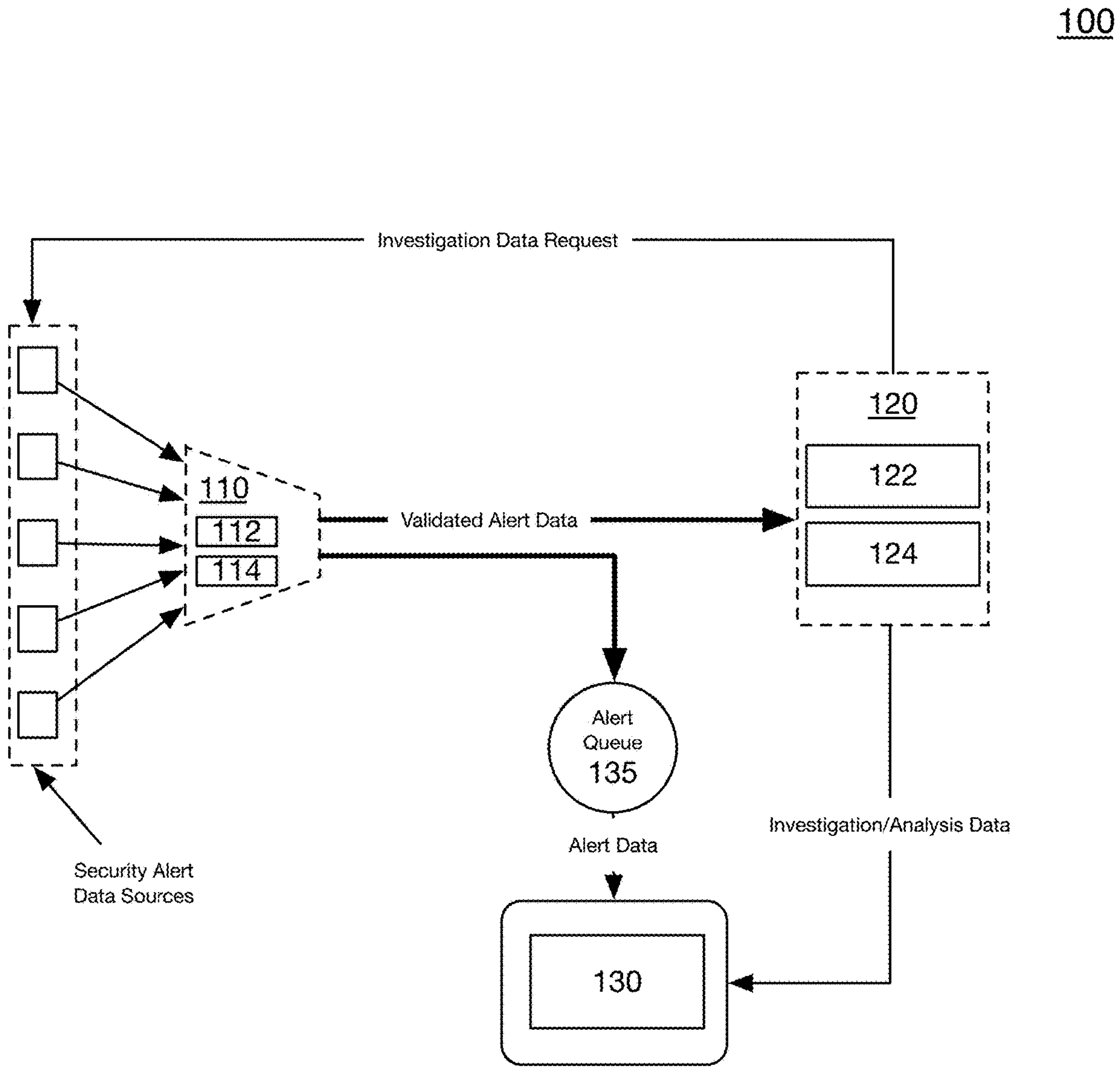
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data and/or a plurality of distinct security devices. In one or more embodiments, the module 110 may be implemented by an alert application programming interface (API) that may be programmatically integrated with one or more APIs of the plurality of distinct sources of cyber security alert data, the plurality of distinct security devices, and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response (e.g., threat remediation response) by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format that may enable accelerated threat detection and threat mitigation actions.

1.1.1 Security Alert Machine Learning System

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security threat mitigation user interface 130 (e.g., Workbench) may function to enable an analyst, a subscriber, and/or an administrator to perform, in a parallel manner, monitoring, investigations, and reporting of security incidents and resolutions (e.g., mitigation actions, remediation actions, or the like) to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to one or more user interfaces accessible to a subscribing entity.

Accordingly, in or more embodiments, a system user (e.g., an analyst) or an administrator implementing the security threat mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security threat mitigation user interface 130 may include and/or may be in digital communication with a security alert queue 135 that stores and prioritizes validated security alerts.

Figure 2:
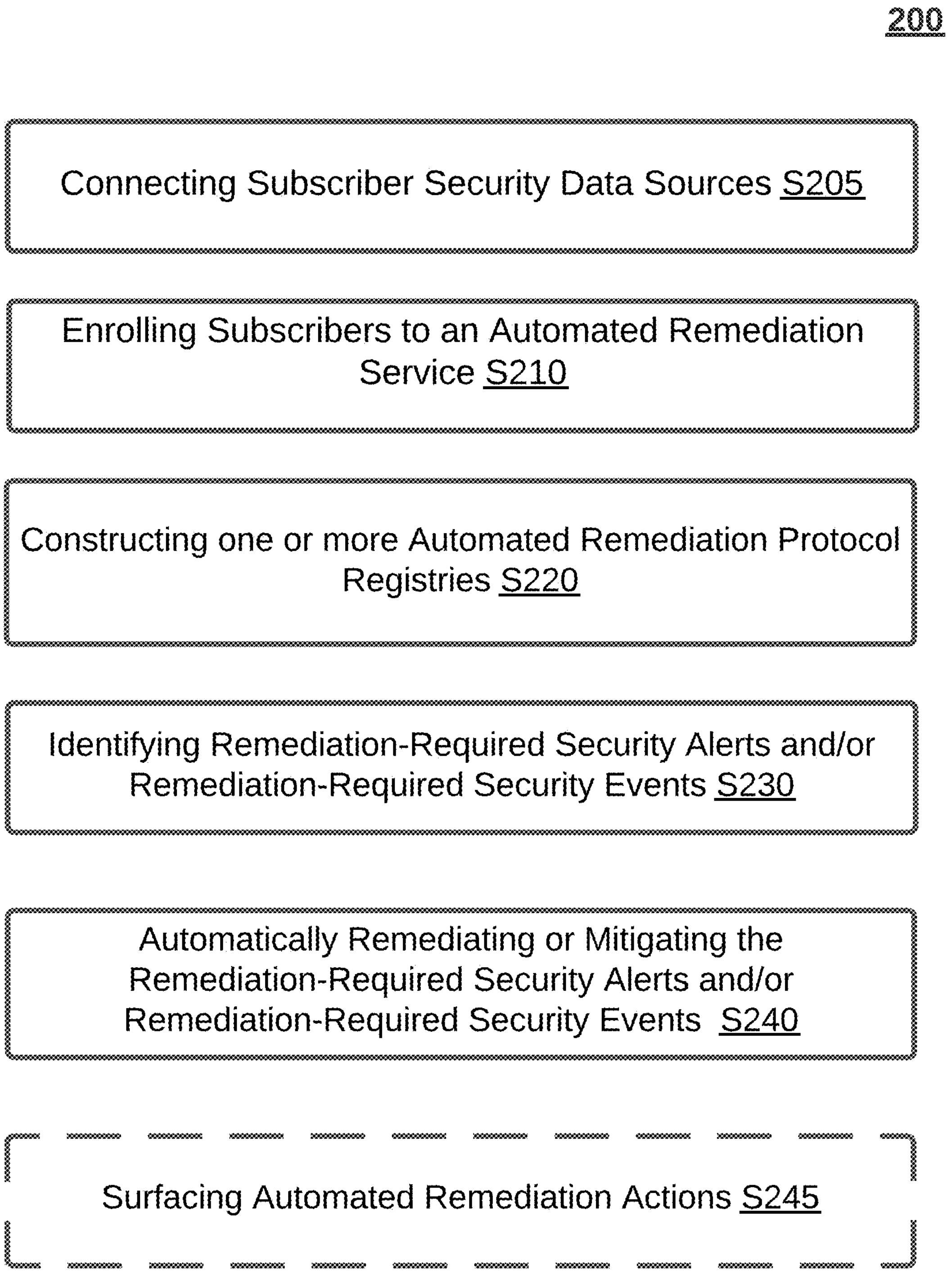
FIG. 2 illustrates an example method 200 in accordance with one or more embodiments of the present application.

2. Method for Accelerated Remediation of Cybersecurity Alerts and/or Cybersecurity Events through Automated Cybersecurity Remediations As shown in FIG. 2, a method 200 for accelerated remediation and/or mitigation of cybersecurity alerts and/or cybersecurity events may include connecting subscriber security data sources S205, enrolling subscribers to an automated remediation service S210, constructing an automated remediation protocol registry S220, identifying remediation-required security alerts and/or remediation-required security events S230, and automatically remediating or mitigating the remediation-required security alerts and/or the remediation-required security events S240. The method may optionally include surfacing automated remediation actions S245.

2.05 Connecting Subscriber Security Data Sources and/or Subscriber Security Devices S205, which includes connecting security data sources and technology sources, may function to digitally connect (or register) one or more distinct security data sources and/or one or more technology sources of a target subscriber to the cybersecurity event detection and response service. A security data source, as referred to herein, preferably relates to a security vendor (e.g., Okta™, Crowdstrike™, or the like), a cloud object storage (e.g., S3 bucket or the like), a device (having an on-device agent, etc.), application, cloud services, and/or any suitable storage medium that may store data subject to protective security policies of a target subscriber. A technology source, as referred to herein, preferably relates to a device, a third-party service or application (e.g., O365, and the like), a (virtual) technological environment, and/or the like that may be implemented by and provided as a service of a target subscriber and that may be subject to protective security policies of the target subscriber. It shall be noted that the phrase "security data source" and/or the phrase "technology source" may also be referred to herein as a "security device."

In one or more embodiments, digitally connecting security data sources and/or technology sources of one or more target subscribers may enable the cybersecurity event detection and response service to source and/or collect event/alert data associated with the one or more target subscribers. As described in more detail herein, a system or service implementing the method 200 may function to generate one or more remediation actions and/or one or more mitigation actions that may cause an automatic remediation or mitigation of compromised digital assets of a target subscriber based on the event/alert data, when applicable.

In one or more embodiments, S205 may function to electronically connect (or register) one or more distinct subscriber security data sources and/or one or more technology sources of a target subscriber via a web-based user interface of the cybersecurity event detection and response service. In such embodiments, the web-based user interface may include one or more user interface objects that may provide a capability for target subscribers (to the service or system 100) to intelligently connect one or more distinct security data sources (e.g., one or more security devices) including, but not limited to, Crowdstrike™, Microsoft Advanced Threat Protection™, SentinelOne®, Carbon Black Cloud™, Palo Alto XDR™, Office365™, Okta™, Amazon Web Services™, and/or the like to the cybersecurity event detection and response service (e.g., the system 100 implementing the method 200).

Accordingly, in one or more embodiments, digitally connecting or registering the one or more distinct security data sources to the cybersecurity event detection and response service may include a target subscriber providing one or more pieces of API connection data (e.g., API username, API key, Client ID, etc.) to one or more user interface elements of the web-based user interface. Accordingly, in such embodiments, based on the cybersecurity event detection and response service receiving or obtaining, via the web-based user interface, the one or more pieces of API connection data of a target security device, S205 may function to automatically connect or register, via one or more computers, the target security device with the cybersecurity event detection and response service.

It shall be noted that, in one or more embodiments, based on the target security device being successfully connected or registered with the cybersecurity event detection and response service, the cybersecurity event detection and response service may function to source, obtain, and/or receive (e.g., third-party) cybersecurity event data and/or (e.g., third-party) cybersecurity alert data from the target security device.

At least one technical advantage of connecting or registering one or more security devices, one or more third-party security services, and/or one or more third-party security applications of a target subscriber to the cybersecurity event detection and response service may enable the cybersecurity event detection and response service to have direct access to the one or more pieces of API connection data for each distinct security device, third-party security service, and/or third-party security application thereby enabling an API-based automated remediation channel to each underlying device, application, and/or service of the subscriber, as described in more detail herein.

2.10 Intelligently Enrolling Subscribers to one or more Automated Remediation Action Types of the Cybersecurity Event Detection and Response Service S210, which includes intelligently enrolling subscribers to an automated remediations microservice of the cybersecurity event detection and response service, may function to enroll one or more subscribers to one or more automated remediation action types of the automated remediations microservice of the cybersecurity event detection and response service. In one or more embodiments, S210 may function to enroll a target subscriber to one or more automated remediation action types of the automated remediations microservice during an enrollment or onboarding of the target subscriber to the cybersecurity event detection and response service. It shall be noted that an automated remediations microservice may also be referred to herein as an "automated remediations service", an "automated mitigations service", or the like.

In one or more embodiments, the automated remediations service may function to (e.g., automatically) mitigate or remediate a target compromised digital asset, a target digital resource or the like associated with a remediation-required cybersecurity event or remediation-required cybersecurity alert. In such embodiments, the automated remediations service may function to automatically generate one or more compromised asset application programming interface (API) requests and/or one or more remediation action API requests that, when executed, automatically resolves, or mitigates a cybersecurity threat associated with a remediation-required cybersecurity event and/or a remediation-required cybersecurity alert. Additionally, or alternatively, in one or more embodiments, an automated remediations microservice may function to automatically remediate (or mitigate), in real-time or near real-time, cybersecurity alerts/events exceeding a threat severity threshold and/or automatically remediate (or mitigate) cybersecurity events/alerts that may have been promoted to an incident severity level (e.g., confirmed cybersecurity threat) based on the results or findings of one or more cybersecurity investigations.

In one or more embodiments, via one or more computers, S210 may function to enroll a target subscriber into an automated host containment remediations service based on receiving a subscriber request that corresponds to enrolling the subscriber into the automated host containment remediations service. In such embodiments, the automated host containment remediations service may function to automatically terminate existing network connections and prevent new network connections from digitally communicating with a target compromised network host by automatically constructing and automatically executing one or more compromised asset application programming interface (API) requests. It shall be noted that, in one or more embodiments, the target compromised network host may be automatically obtained, automatically sourced, and/or automatically extracted from event features and/or event metadata of a cybersecurity event and/or cybersecurity alert that corresponds to malicious activity.

In one or more embodiments, via one or more computers, S210 may function to enroll a target subscriber into an automated user account disablement remediations service based on receiving a subscriber request that corresponds to enrolling the subscriber into the automated user account disablement remediations service. In such embodiments, the automated user account disablement remediations service may function to (e.g., automatically) temporarily or permanently disable a target compromised user account to prevent unauthorized access to one or more target computing environments of a target subscriber by automatically constructing and automatically executing one or more compromised asset application programming interface (API) requests. It shall be noted that, in one or more embodiments, the target compromised user account may be automatically obtained, automatically sourced, and/or automatically extracted from event features and/or event metadata of a cybersecurity event and/or cybersecurity alert that corresponds to malicious activity.

In one or more embodiments, via one or more computers, S210 may function to enroll a target subscriber into an automated cloud computing environment remediations service based on receiving a subscriber request that corresponds to enrolling the subscriber into the automated cloud computing environment remediations service. In such embodiments, the automated cloud computing environment remediations service may function to automatically terminate, automatically suspend, and/or automatically cease digital events from occurring on a target compromised clouding computing environment of a target subscriber by automatically constructing and automatically executing one or more compromised asset application programming interface (API) requests. It shall be noted that, in one or more embodiments, the target compromised clouding computing environment may be automatically obtained, automatically sourced, and/or automatically extracted from event features and/or event metadata of a cybersecurity event and/or cybersecurity alert that corresponds to malicious activity.

In one or more embodiments, via one or more computers, S210 may function to enroll a target subscriber into an automated cloud access key remediations service based on receiving a subscriber request that corresponds to enrolling the subscriber into the automated cloud access key remediations service. In such embodiments, the automated cloud access key remediations service may function to automatically disable or automatically modify a target compromised cloud access key of a target subscriber by automatically constructing and automatically executing one or more compromised asset application programming interface (API) requests. It shall be noted that, in one or more embodiments, the target compromised cloud access key may be automatically obtained, automatically sourced, and/or automatically extracted from event features and/or event metadata of a cybersecurity event and/or cybersecurity alert that corresponds to malicious activity.

In one or more embodiments, via one or more computers, S210 may function to enroll a target subscriber into an automated electronic communication remediations service based on receiving a subscriber request that corresponds to enrolling the subscriber into the automated electronic communication remediations service. In such embodiments, the automated electronic communication remediations service may function to automatically delete, automatically remove, and/or automatically move to a disposal location (e.g., trash), a target malicious electronic communication (e.g., an email or the like) from a majority of or all electronic messaging accounts of a target subscriber by automatically constructing and automatically executing one or more compromised asset application programming interface (API) requests. It shall be noted that, in one or more embodiments, the target malicious electronic communication may be identified during an (e.g., automated, semi-automated, and/or manual) cybersecurity investigation of a cybersecurity event and/or cybersecurity alert of the target subscriber.

In one or more embodiments, via one or more computers, S210 may function to enroll a target subscriber into an automated hash signature remediations service based on receiving a subscriber request that corresponds to enrolling the subscriber into the automated hash signature remediations service. In such embodiments, the automated hash signature remediations service may function to automatically prevent a target malicious application that corresponds to a target malicious hash signature from executing on one or more target digital environments of a target subscriber by automatically constructing and automatically executing one or more compromised asset application programming interface (API) requests. It shall be noted that, in one or more embodiments, the target malicious hash signature may be identified during an (e.g., automated, semi-automated, and/or manual) cybersecurity investigation of a cybersecurity event and/or cybersecurity alert of the target subscriber.

In one or more embodiments, via one or more computers, S210 may function to enroll a target subscriber into an automated command-and-control communication remediations service based on receiving a subscriber request that corresponds to enrolling the subscriber into the automated command-and-control communication remediations service. In such embodiments, the automated command-and-control communication remediations service may function to automatically block a target malicious domain and/or target malicious internet protocol address associated with a target (e.g., malicious) command-and-control communication for the target subscriber by automatically constructing and automatically executing one or more comprised asset application programming interface (API) requests. It shall be noted that, in one or more embodiments, the target malicious domain and/or the target malicious internet protocol address may be identified during an (e.g., automated, semi-automated, and/or manual) cybersecurity investigation of a cybersecurity event and/or cybersecurity alert of the target subscriber.

In one or more embodiments, executing the compromised asset API request and/or the remediation action API request may alter an operating state or mode of one or more third-party security applications of a target subscriber, one or more third-party security services of the target subscriber, and/or any suitable service, application, or computing environment of the target subscriber in analogous ways as described above.

Enrolling Subscribers to One or More Automated Remediation Action Types Via a Graphical User Interface (GUI)

Figure 3:
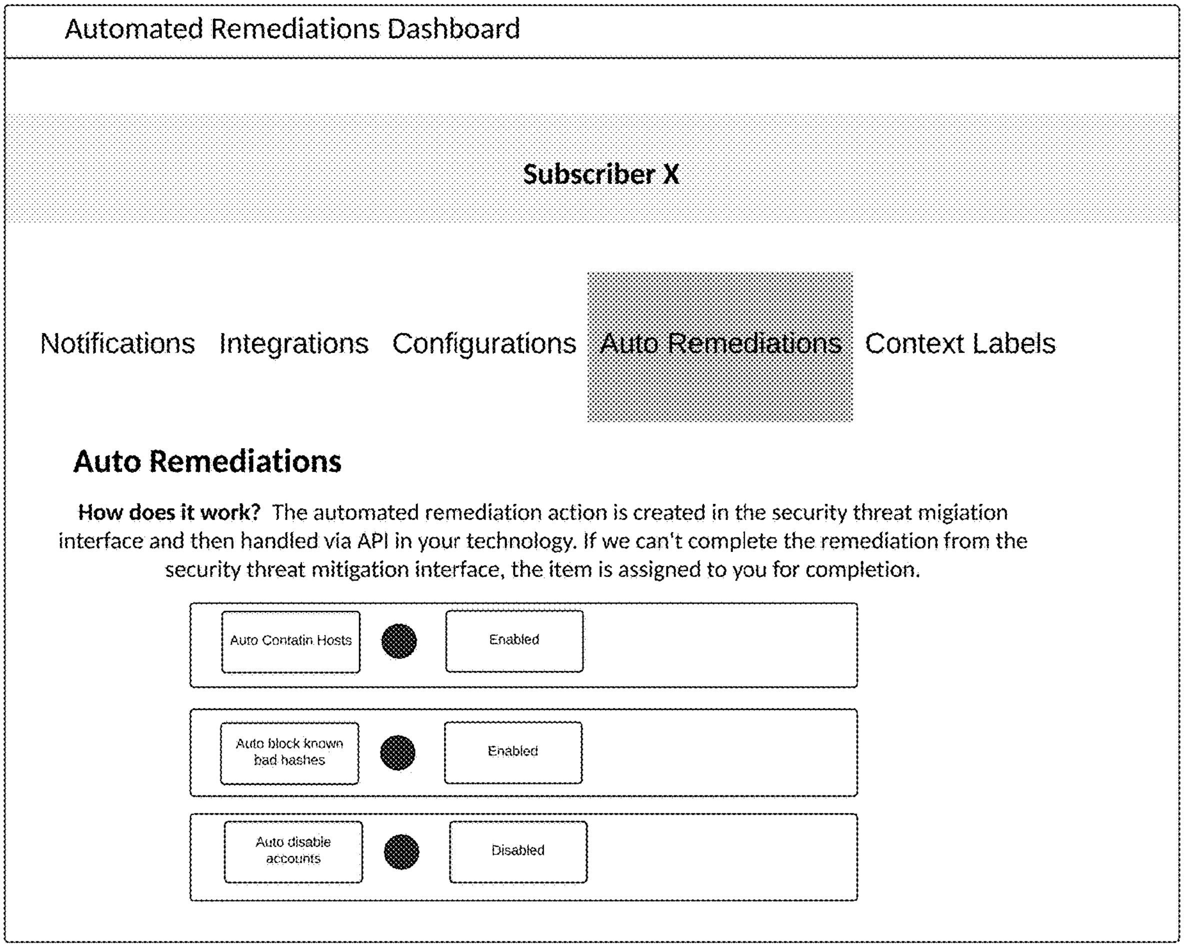
FIG. 3 illustrates an example representation of an automated remediations enrollment dashboard for a target subscriber in accordance with one or more embodiments of the present application.
Figure 8:
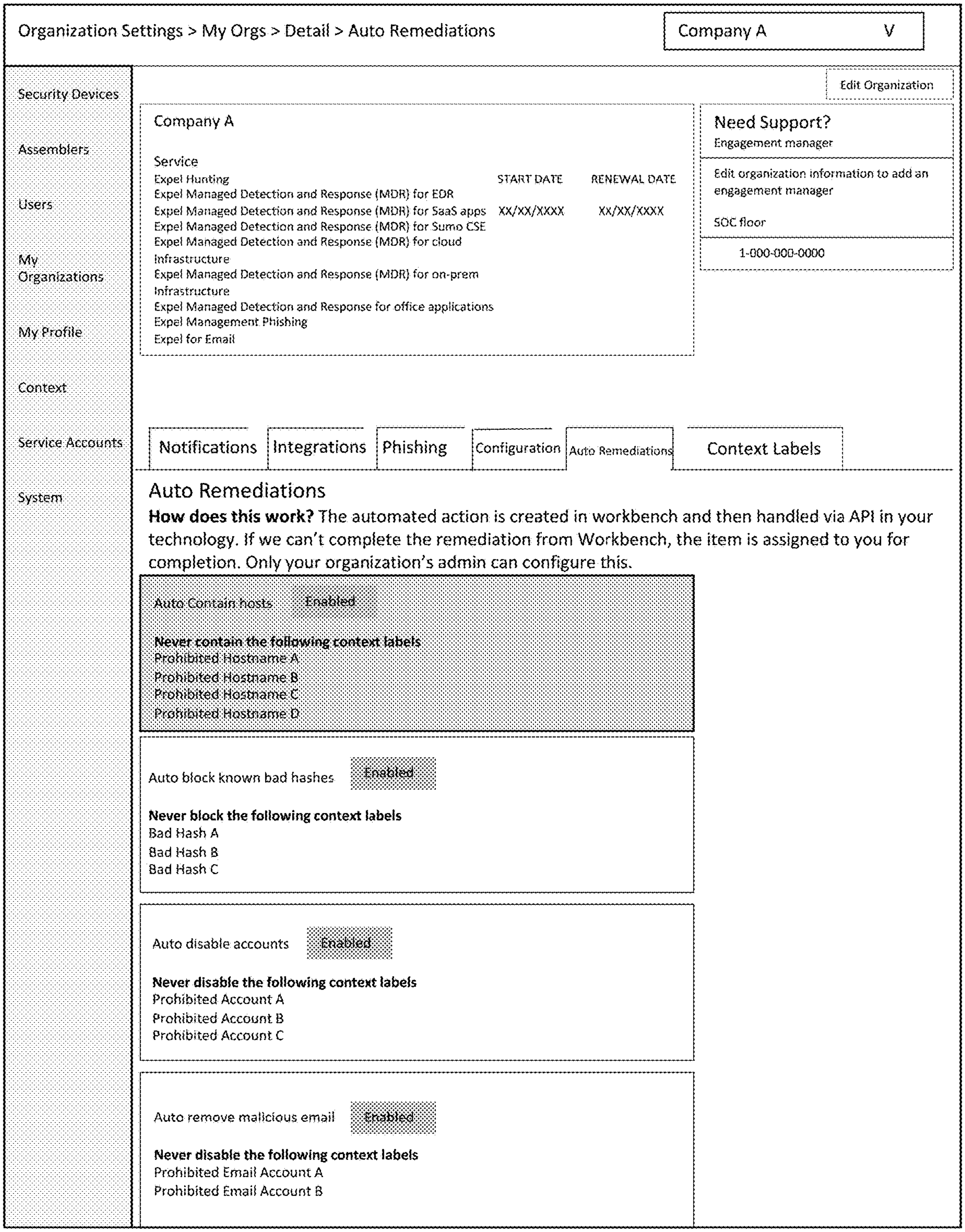
FIGS. 8-16 illustrates exemplarily graphical user interfaces in accordance with one or more embodiments of the present application.
Figure 11:
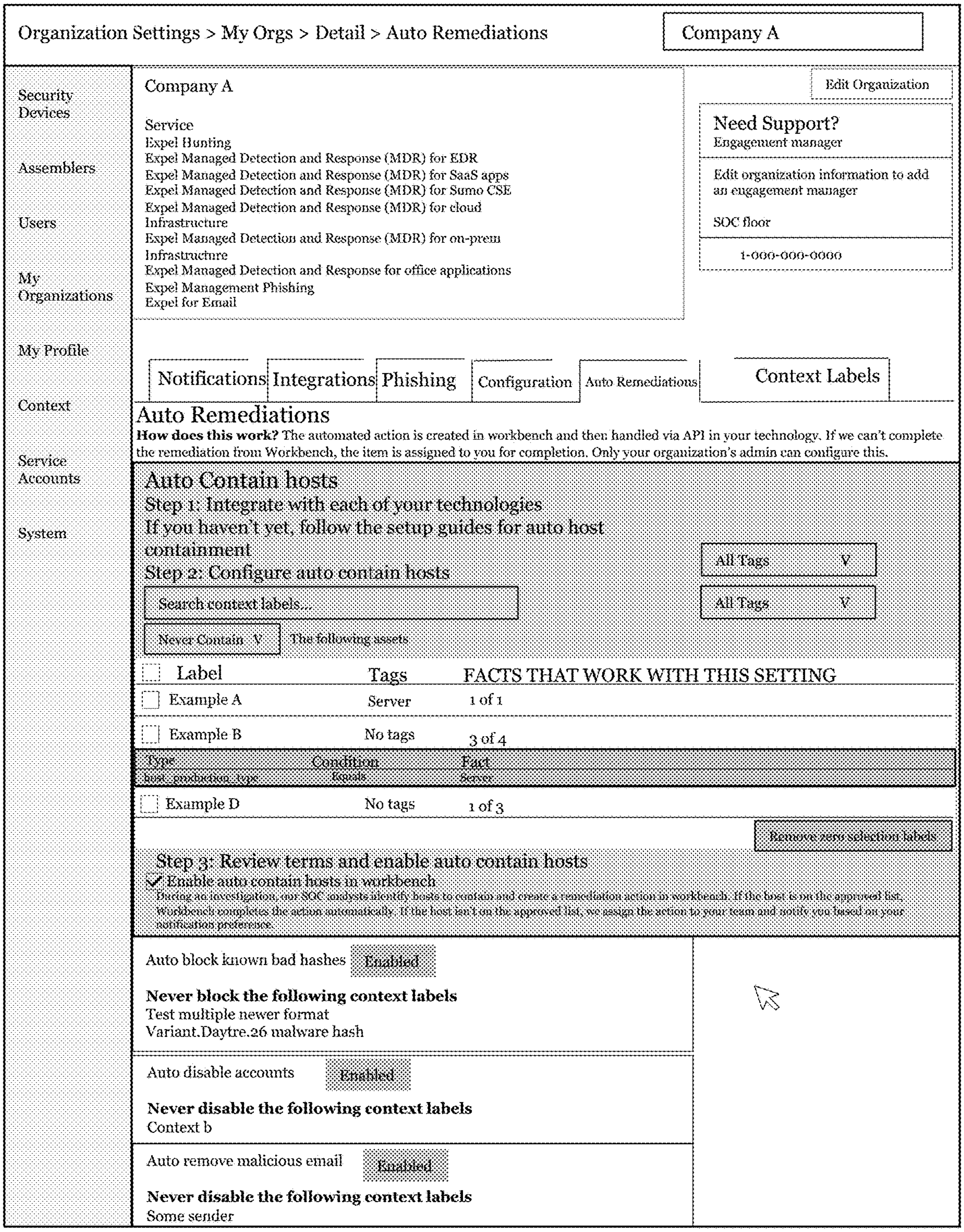

In one or more embodiments, to enroll one or more subscribers to the automated remediations service, S210 may function to implement or display, via one or more computers, a client enrollment interface that preferably requires target subscribers to (e.g., manually) enroll into each distinct automated remediation capability provided by the automated remediations service, as shown generally by way of example in FIG. 3, FIG. 8, and FIG. 11. In such embodiments, each distinct automated remediation capability of the automated remediations service may correspond to a distinct automated remediation action type (e.g., a first automated remediation capability of the automated remediations microservice may correspond to containing compromised hosts, a second automated remediation capability of the automatic remediation service may correspond to blocking bad hashes, etc.).

Figure 9:
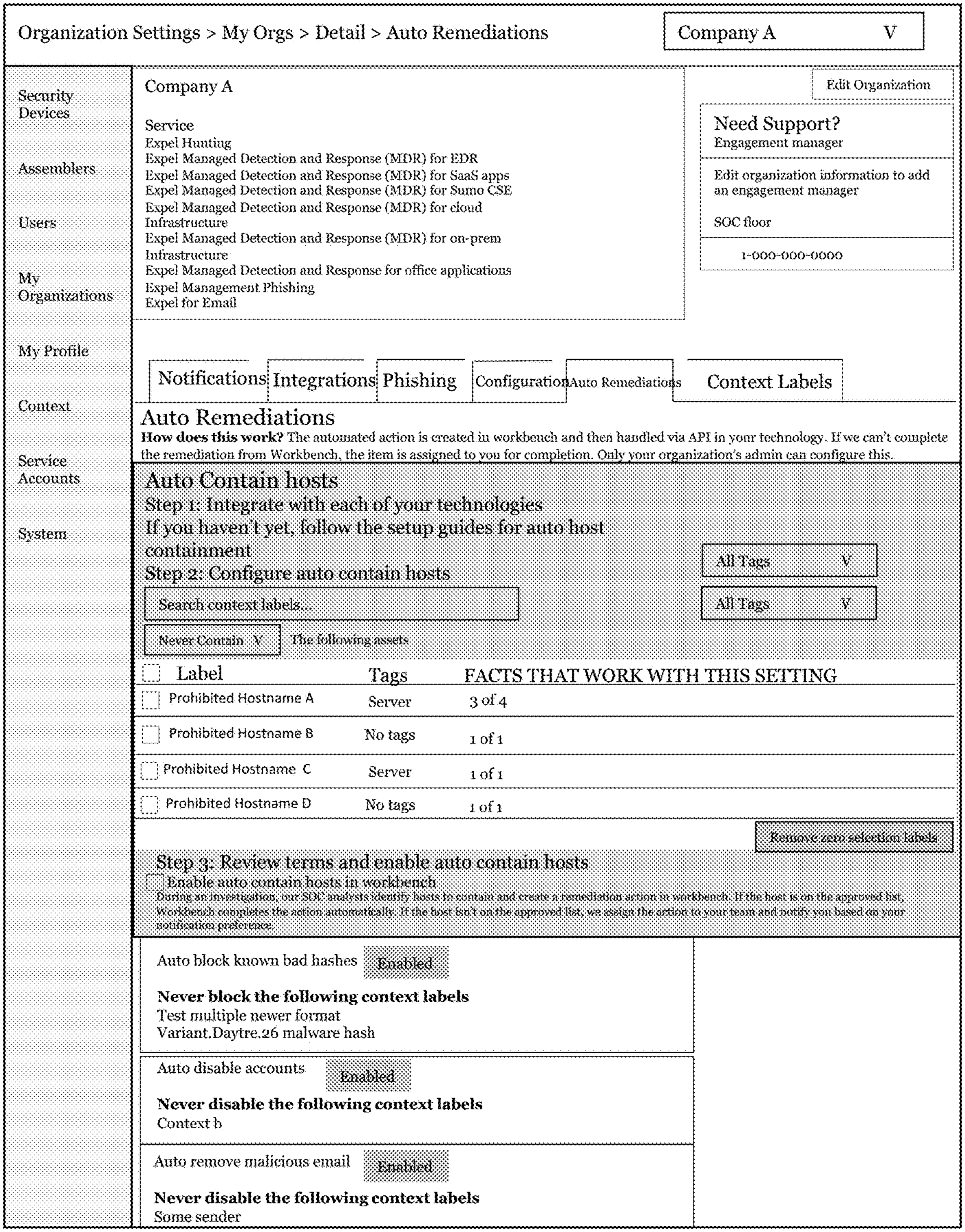
Figure 10:
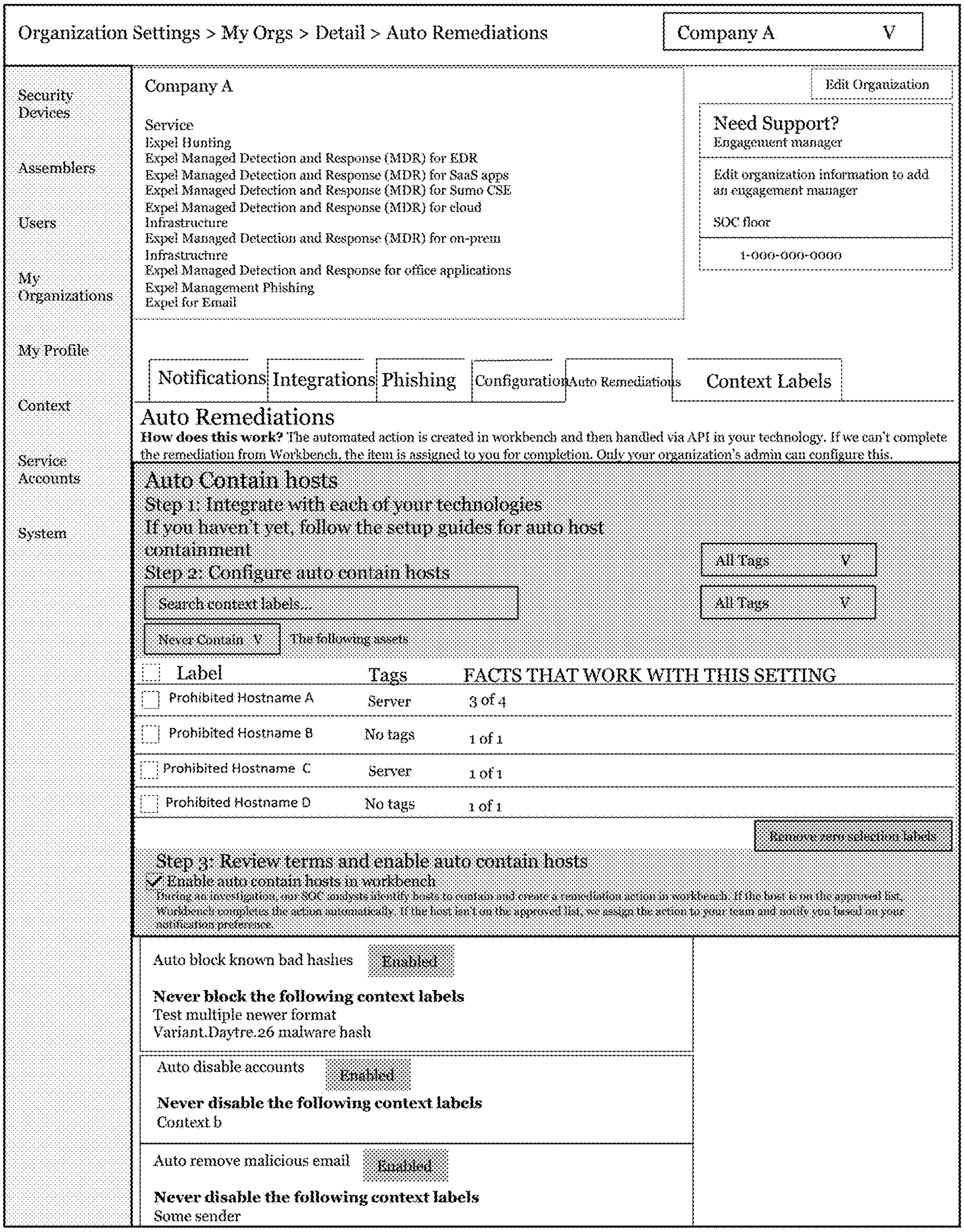

In one or more embodiments, via one or more computers, S210 may function to implement a client enrollment user interface (e.g., an automated remediations enrollment user interface or the like) that may graphically display a plurality of distinct automated remediation action types of the automated remediations microservice. In one or more embodiments, while displaying the client enrollment user interface, S210 may function to automatically enroll a target subscriber to a first distinct automated remediation action type of the plurality of distinct automated remediation action types based on receiving an input from the target subscriber selecting an automated enrollment user interface object that corresponds to the first distinct automated remediation action type, as shown generally by way of example in FIG. 9 and FIG. 10. Additionally, or alternatively, in one or more embodiments, while displaying the client enrollment user interface, S210 may function to automatically enroll a target subscriber to a second distinct automated remediation action type of the plurality of distinct automated remediation action types based on receiving an input from the target subscriber selecting an automated enrollment user interface object that corresponds to the second distinct automated remediation action type. Additionally, or alternatively, in one or more embodiments, while displaying the client enrollment user interface, S210 may function to not enroll a target subscriber to a third distinct automated remediation action type of the plurality of distinct automated remediation action types based on not receiving an input from the target subscriber selecting an automated enrollment user interface object that corresponds to the third distinct automated remediation action type. It shall be noted that the automated enrollment user interface object may be a selectable user interface object that, when selected by a subscriber or the like, automatically enrolls the subscriber to an automated remediation action type to which the automated enrollment user interface object corresponds.

In one or more embodiments, S210 may function to enable, via an enrollment interface or the like, a target subscriber to enroll into at least one automated remediation capability of the automated remediation service based on receiving an automated remediation enrollment signal, via the client enrollment interface, indicating that the target subscriber prefers the system or service 100 provides the at least one automated remediation capability. That is, S210 may function to receive a distinct automated remediation enrollment signal for each distinct automated remediation capability (e.g., each distinct automated remediation action type) of the automated remediation service to which the subject subscriber prefers to be enrolled. At least one technical benefit of requiring the subscriber to opt-in or manually enroll into each distinct automated remediation action type allows the cybersecurity event detection to intelligently tune an automated remediation service on a per-subscriber basis (e.g., each distinct subscriber of the cybersecurity event detection and response service may opt-in or enroll into the automated remediation action types that the subscriber prefers the cybersecurity event detection and response service to automatically handle and opt-out of the automated remediation action types that the subscriber prefers to manually handle).

For instance, in a non-limiting example, S210 may function to receive a first automated remediation enrollment signal indicating that a subject subscriber may prefer the automated remediation service to provide automated remediation support associated with a first remediation action type (e.g., containing compromised hosts). Stated another way, in one or more embodiments, S210 may function to automatically enroll the subject subscriber to the first remediation action type based on receiving, via one or more computers, one or more inputs from the subscriber selecting and/or directed to an automated enrollment user interface object that corresponds to the first remediation action type.

In another non-limiting example, S210 may function to receive a second automated remediation enrollment signal indicating that a subject subscriber may prefer the automated remediation service to provide automated remediation support associated with a second remediation action type (e.g., blocking bad hashes). Stated another way, in one or more embodiments, S210 may function to automatically enroll the subject subscriber to the second remediation action type based on receiving, via one or more computers, one or more inputs from the subscriber selecting and/or directed to an automated enrollment user interface object that corresponds to the second remediation action type.

In another non-limiting example, S210 may function to receive a third automated remediation enrollment signal indicating that a subject subscriber may prefer the automated remediation service to provide (automated) remediation support associated with a third remediation action type (e.g., disabling compromised user accounts and credential reset). Stated another way, in one or more embodiments, S210 may function to automatically enroll the subject subscriber to the third remediation action type based on receiving, via one or more computers, one or more inputs from the subscriber selecting and/or directed to an automated enrollment user interface object that corresponds to the third remediation action type.

In another non-limiting example, S210 may function to receive a fourth automated remediation enrollment signal indicating that a subject subscriber may prefer the automated remediation service to provide (automated) remediation support associated with a fourth remediation action type (e.g., blocking command-and-control communications). In one or more embodiments, the fourth remediation action type, when executed, may enable a service or system (e.g., system 100) implementing the method 200 to directly control a subject or affected service account, device, application, or the like. Stated another way, in one or more embodiments, S210 may function to automatically enroll the subject subscriber to the fourth remediation action type based on receiving, via one or more computers, one or more inputs from the subscriber selecting and/or directed to an automated enrollment user interface object that corresponds to the fourth remediation action type. In such embodiments, the fourth remediation action type may include the implementation of a secure mechanism, such as a Service Account, that enables an execution of remediation actions, via APIs and/or the like, directly on the service account or affect application/device. That is, user-level or admin-level command and control may be enabled for blocking adverse signals or attacks and further, for instantiating protective mechanism directly onto the service account.

In another non-limiting example, S210 may function to display, via or more computers, a subscriber enrollment interface that graphically displays a plurality of distinct automated mitigation action types provided by the cybersecurity event detection and response service. In such non-limiting example, S210 may function to receive, via the one or more processors, a subscriber enrollment request for one of the plurality of distinct automated mitigation action types provided by the cybersecurity event detection and response service. Accordingly, in response to receiving the subscriber enrollment request, S210 may function to automatically enroll the subscriber into the one of the plurality of distinct automated mitigation action types.

It shall be noted that the automated remediation service may include additional, fewer, or different automated remediation capabilities in other embodiments without departing from the scope of the claimed invention.

Subscriber-Specific Remediation Context Data Structure

Figure 4:
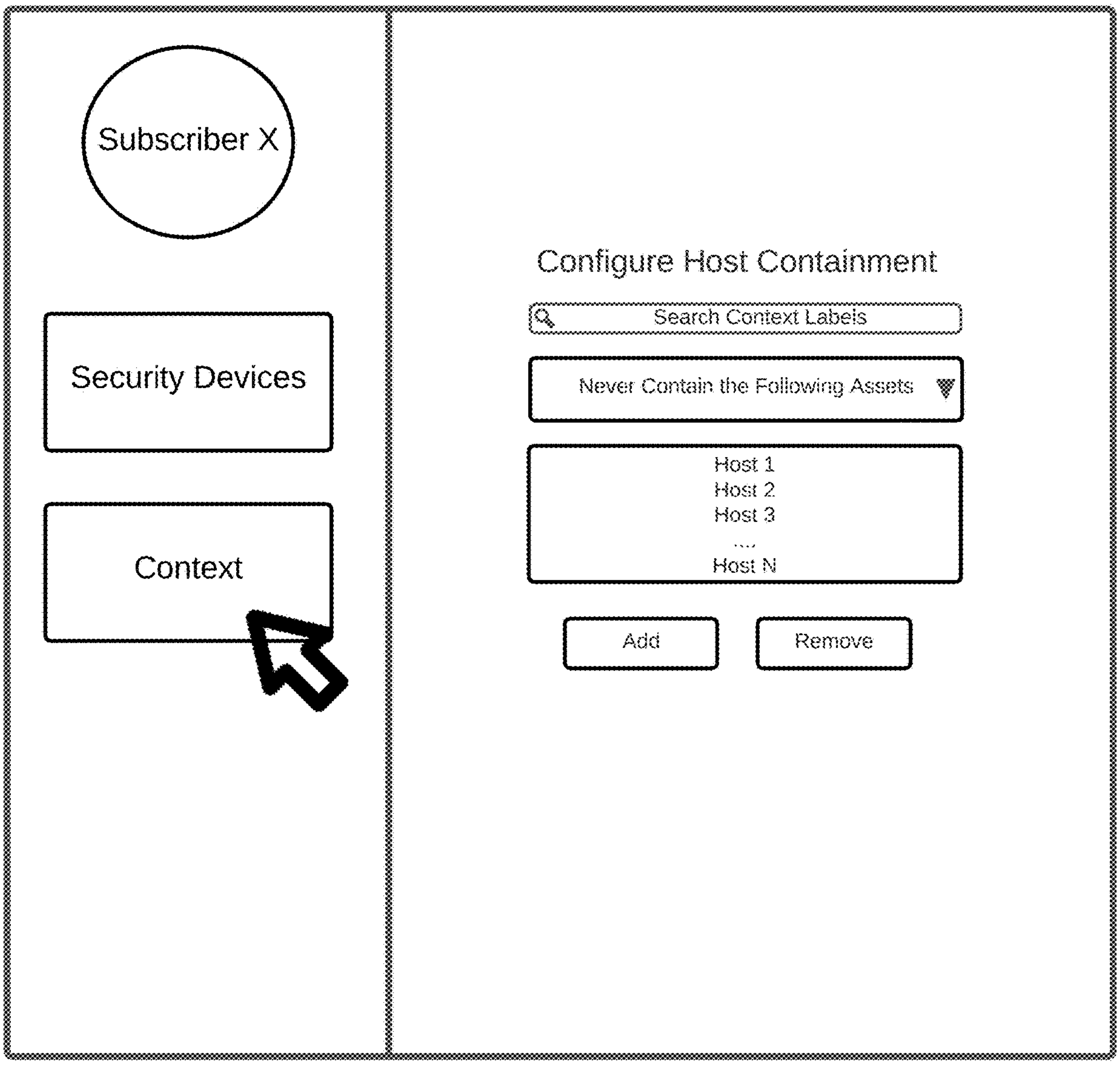
FIG. 4 illustrates an example representation of a subscriber-specific remediation context data structure in accordance with one or more embodiments of the present application.

In one or more embodiments, for each distinct remediation action capability (e.g., each distinct automated remediation action type) that a target subscriber may enroll into or opt-into, S210 may function to preferably require a distinct subscriber-specific remediation context data structure (e.g., distinct subscriber-specific mitigation context data structure) to be constructed or defined. Each distinct subscriber-specific remediation context data structure constructed or defined for a subject automated remediation action type or remediation action capability may provide remediation parameters or criteria that may inform the automated remediation service of the digital assets of a subject subscriber that the automatic remediation service may or may not perform automated remediation actions (e.g., automated mitigation actions) thereon, as shown generally by way of example in FIG. 4. That is, each distinct subscriber-specific remediation context data structure may impose boundaries (or fences) on the digital assets that the automated remediation service may or may not provide automated remediation support on for a subject automated remediation action type that a subject subscriber opts into. At least one technical advantage of configuring a subscriber-specific remediation context data structure on a per-remediation action type basis may enable the subscriber to define the digital assets that are authorized to be automatically remediated and/or the digital asserts that are prohibited to be automatically remediated for a subject remediation action type. Another technical advantage of the above-mentioned subscriber-enrollment and the above-mentioned subscriber-specific remediation context data structure enables a subject subscriber to determine what types of remediation actions they prefer to be implemented or executed automatically by the cybersecurity event detection and response service and the digital resources (e.g., digital assets, etc.) that the cybersecurity event detection and response service may remediate on behalf of the subscriber (e.g., the subscriber provides and/or decides the users and/or endpoints for which automated remediation actions may be executed thereon).

Figure 5:
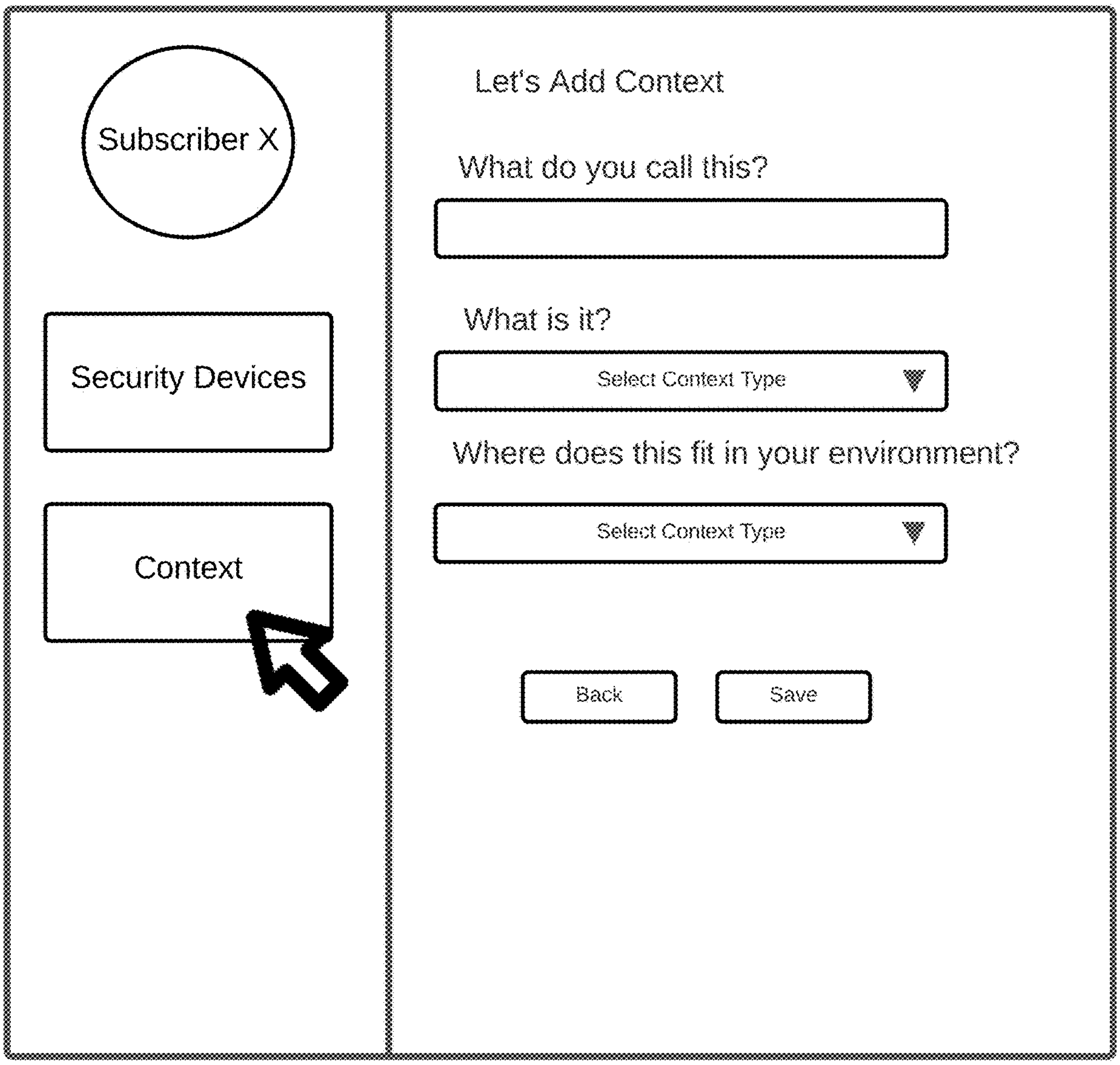
FIG. 5 illustrates an example representation of individually adding one or more pieces remediation context data in accordance with one or more embodiments of the present application.

In a first implementation, S210 may function to identify or receive subscriber-specific remediation context data via a web-based user interface (e.g., an automated mitigations user interface or the like) of the cybersecurity event detection and response service. In such embodiments, the web-based user interface may include one or more user interface objects that may enable subject subscribers to individually provide the subscriber-specific remediation context data to the system or service 100, as shown generally by way of example in FIG. 5.

Figure 6:
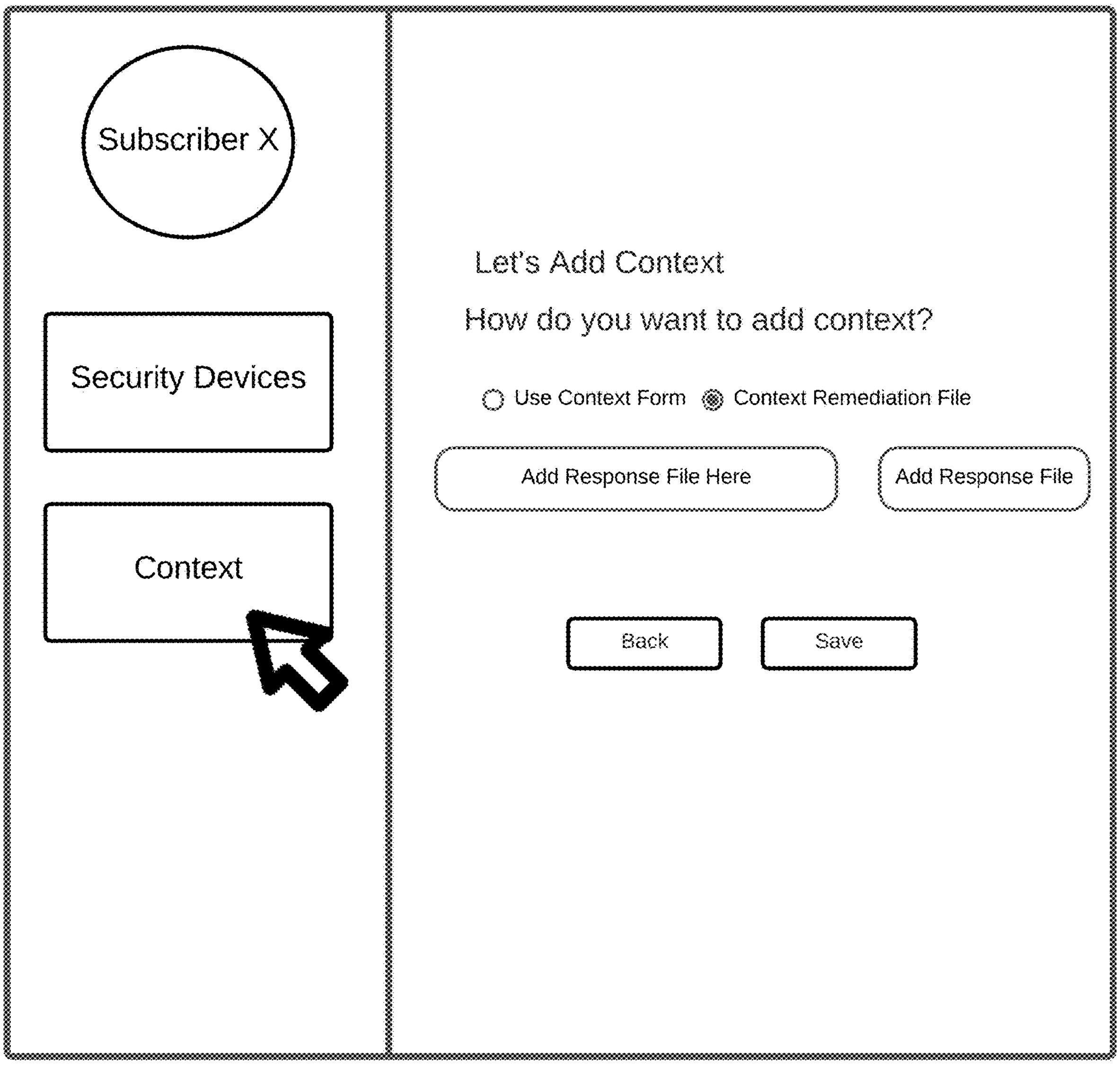
FIG. 6 illustrates an example representation of adding, in bulk, remediation context data in accordance with one or more embodiments of the present application.

Additionally, or alternatively, in a second implementation, S210 may function to identify or receive subscriber-specific remediation context data defined by a target subscriber, in bulk, via a web-based user interface of the cybersecurity event detection and response service. In such embodiments, the web-based user interface may include one or more user interface objects that enable subject subscribers to upload one or more documents or files, in bulk, that preferably includes subscriber-specific remediation context data to the system or service 100, as shown generally by way of example in FIG. 6. Additionally, in a variant of this second implementation, subscriber-specific remediation context data may be defined via any suitable user interface in operable communication with one or more application programming interfaces (APIs) of a system or service (e.g., system 100) implementing the method 200. Additionally, or alternatively, in a further variant of this second implementation, subscriber-specific remediation context data may be defined via a hypertext transfer protocol (HTTP) of a context definition file and/or the like.

Additionally, or alternatively, in a third implementation, while displaying, via one or more computers, an automated mitigations user interface that may graphically display a plurality of distinct automated mitigation action types of the cybersecurity event detection and response service, S210 may function to automatically enroll, via the one or more computers, a target subscriber to a first distinct automated mitigation action type of the plurality of distinct automated mitigation action types based on the target subscriber selecting an automated enrollment user interface object that corresponds to the first distinct automated mitigation action type. Additionally, in one or more embodiments, while displaying the automated mitigations user interface, S210 may function to obtain and/or receive, via the one or more computers, one or more authorized subscriber-specific digital assets (e.g., one or more authorized subscriber-specific digital resources or the like) on which the subscriber authorizes the cybersecurity event detection and response service to execute automated mitigation actions for (or corresponding to) the first distinct automated mitigation action type based on receiving one or more inputs from the subscriber and/or one or more prohibited subscriber-specific digital assets (e.g., one or more prohibited subscriber-specific digital resources on which the subscriber prohibits the cybersecurity event detection and response service to execute automated mitigations actions for the first distinct automated mitigation action type based on receiving one or more inputs from the subscriber. Accordingly, S210 may function to generate and/or define a subscriber-specific remediation context data structure for the first distinct automated remediation action type based on the one or more authorized subscriber-specific digital assets and/or the one or more prohibited subscriber-specific digital assets.

Additionally, or alternatively, in one or more embodiments of the third implementation, while displaying the automated mitigations user interface, S210 may function to obtain from the subscriber, via the automated mitigations user interface, an authorized corpus of subscriber-specific digital assets (e.g., an authorized corpus of subscriber-specific digital resources or the like) that the subscriber authorizes the cybersecurity event detection and response service to execute automated mitigations actions on for a second distinct automated mitigation action type based on receiving one or more inputs from the subscriber at the automated mitigations user interface and/or a prohibited corpus of subscriber-specific digital assets (e.g., a prohibited corpus of subscriber-specific digital resources or the like) that the subscriber prohibits the cybersecurity event detection and response service to execute automated mitigations actions on for the second distinct automated mitigation action type based on receiving one or more inputs from the subscriber at the automated mitigations user interface. Accordingly, in one or more embodiments, S210 may function to generate, via one or more computers, a subscriber-specific mitigation context data structure for the second distinct automated mitigation action type based on the authorized corpus of subscriber-specific digital assets and/or the prohibited corpus of subscriber-specific digital assets.

2.20 Constructing an Automated Remediation Protocol Registry

S220, which includes constructing an automated remediation protocol registry, may function to construct an automated remediation protocol registry that may include a plurality of distinct remediation-type APIs (e.g., a plurality of distinct cybersecurity mitigation-type APIs or the like). In one or more embodiments, S220 may function to construct the automated remediation protocol registry using any suitable data structure including, but not limited to, a reference table, trees, graphs, linked lists, arrays, and/or the like. Additionally, or alternatively, the automated remediation protocol registry may be in operable communication or connection with a security threat mitigation user interface 130 (e.g., Workbench) and/or the cybersecurity event detection and response service. In such embodiments, remediation data signals or remediation instructions (e.g., a service-proposed remediation action, a service-generated threat mitigation action, etc.) generated from or via the security threat mitigation interface may inform a search or query to the automated remediation protocol registry for automatically identifying and constructing an API-based remediation action request that, when executed, mitigates or remediates a cybersecurity threat associated with a target cybersecurity event and/or a target cybersecurity alert.

In one or more embodiments, the automated remediation protocol registry may include a plurality of distinct remediation-type API definitions and protocols for each distinct API of the plurality of remediation-type APIs. In one or more embodiments, each distinct remediation-type API included in the automated remediation protocol registry, when constructed and/or executed, may include a request to a target third-party security vendor (e.g., a third-party security application, a third-party security service, a security data source, Okta, O365, or the like) to remediate (or mitigate) one or more probable cybersecurity threats associated with one or more cybersecurity events of a target subscriber. Additionally, or alternatively, each distinct remediation-type API, when constructed and/or executed, may include a request or API call that may operate to affect or change an operating state or mode of a target device (e.g., computer, server, mobile device, etc.), target application (e.g., software application, software-as-a-service, and the like), target computing resource (e.g., cloud services, databases, and the like), and/or the like associated with a target subscriber.

In one or more embodiments, the API definitions and protocols that may be stored in an automated remediation protocol registry may include one or more of the destination address corresponding to a target API call, the metadata (e.g., required data fields, request body, or the like) corresponding to the target API call, and the API response structure corresponding to the target API call. It shall be noted that the automated remediation protocol registry may include additional, fewer, or different API content/data in other embodiments without departing from the scope of the claimed invention.

In a first implementation, S220 may function to construct an automated remediation protocol registry that may index the plurality of distinct API definitions and protocols based on security vendor type (e.g., security data source type, security device type, third-party security vendor type, third-party security device type, or the like) and/or automated remediation capability type (e.g., remediation action type). That is, in the first implementation, the automated remediation protocol registry may be a data matrix that includes all possible combinations of security vendor types (e.g., security data source types, etc.) and remediation action types of the automated remediation service and the corresponding API protocol(s) and definition(s) that may be configured and designed to be executed by the automated remediation service. It shall be noted that the automated remediation protocol registry may be searchable or queryable to selectively identify a distinct set of API definitions and protocols of the plurality of distinct API definitions and protocols based on a search using security vendor type (e.g., security device type) and/or remediation action type as search parameters.

In a variation of this first implementation, the construction of the automated remediation protocol (ARP) registry may additionally or alternatively include security data source types that may be passive in operation. In a non-limiting example, a security data source that may be passive may include a cloud object storage (e.g., AWS S3 bucket or the like) that may collect and/or log cloud activity data (e.g., security-relevant data) associated with a protected or secured device, application, or service of a subscriber, which may be periodically or continuously streamed to or accessed by a service or system (e.g., system 100) implementing the method 200. In this variation of the first implementation, if the data sourced from the cloud object storage informs a security alert or incident, a query to the ARP registry that includes an identifier of the cloud object storage may function to return and/or execute automated remediation protocols that may enable a direct remediation channel to the underlying device, application, and/or service of the subscriber. That is, in such implementation, the method 200 may function to bypass a security vendor or the like securing or monitoring the underlying device, application, and/or service (the technology) and directly interface with the technology during remediation.

In a second implementation, S220 may function to construct a distinct automated remediation protocol registry for each distinct automated remediation capability (e.g., each distinct automated remediation action type) of the automated remediation service. In such embodiments of the second implementation, each distinct automated remediation protocol registry constructed by S220 may be annotated or assigned a distinct remediation action type label of a plurality of distinct remediation action type labels and include a plurality of distinct API definitions and protocols indexed according to a security vendor type (e.g., third-party security vendor type) that supported by the automated remediation service for a subject automated remediation capability.

For instance, in a nonlimiting example, S220 may function to construct a first automated remediation protocol registry for a first automated remediation action type. The first automated remediation protocol registry may include a plurality of distinct API definitions and protocols indexed according to a plurality of distinct security vendor types (e.g., a plurality of distinct security devices) that may provide remediation capabilities corresponding to the first automated remediation action type and supported by the automated remediation service. In the same nonlimiting example, S220 may additionally function to construct a second automated remediation protocol registry for a second automated remediation action type. The second automated remediation protocol registry may include a plurality of distinct API definitions and protocols indexed according to one or more security vendors (e.g., third-party security devices) that may provide remediation capabilities corresponding to the second automated remediation action type and supported by the automated remediation service. It shall be noted that each distinct automated remediation action-type specific ARP registry may be searchable or queryable to selectively identify a distinct set of API definitions and protocols of the plurality of distinct API definitions and protocols based on a search using security vendor type (e.g., security device type) and/or remediation action type as search parameters.

It shall be further noted that in one or more embodiments of the first implementation or the second implementation, the automated remediation protocol registry may be augmented to include one or more additional security vendors, one or more additional remediation action types, and/or one or more distinct API definitions and protocols.

At least one technical advantage of constructing and/or configuring an automated remediation protocol registry may enable an automated and/or accelerated creation of compromised asset API requests and/or remediation action API requests that, when executed, resolves or mitigates a cybersecurity threat that corresponds to a target malicious cybersecurity event at a security application (e.g., third-party security application) or a security service (e.g., third-party security service) to which the API definitions and protocols of the compromised asset API request and/or the remediation action API request corresponds.

2.30 Identifying Remediation-Required Security Alerts and/or Remediation-Required Security Events S230, which includes identifying remediation-required security alerts and/or security events, may function to identify or detect one or more security alerts and/or security events associated with one or more subscribers to the cybersecurity event detection and response service that may require remediation or mitigation. In one or more embodiments, S230 may function to collect or receive event data and/or security alert data from one or more distinct sources of data (e.g., the connected subscriber security data sources of S210, the connected or registered security devices of S210, or the like) that may generate subscriber-specific alerts involving digital/computing assets of subscribing entities, including, but not limited to, one or more computing resources, computer network resources, data resources, cloud-based resources, any computer accessible digital entity or device, and/or the like. It shall be noted that the terms "remediation-required security alert" and "remediation-required security event" may also be referred to herein as "mitigation-required security alert" and "mitigation-required security event", respectively.

In a first implementation, a system and/or service implementing the method 200 may function to receive a large volume of inbound event data and/or security alert data, which may include a plurality of distinct security alerts and associated security alert data or distinct event data. In such implementation, S230 may function to implement a security alert engine or the like that may function to ingest the large volume of inbound event data and/or inbound security alert data, process a combination of the large volume of inbound event data and/or inbound security alert data, and subsequently, publish one or more validated security alerts based on the processing. Accordingly, S230 may function to perform a cybersecurity investigation, an automated cybersecurity investigation, or the like for each of the one or more validated security alerts or a subset of the validated security alerts to determine if a cybersecurity threat is present. The results of the cybersecurity investigations, in one or more embodiments, may confirm at least a subset of the validated security alerts to be of a cybersecurity threat and/or relate to malicious activity and, thus, requiring remediation (e.g., the remediation-required security alerts or remediation-required security events of the plurality of security alerts/security events).

It shall be noted that for investigating validated security alerts, reference is made to U.S. patent application Ser. No. 17/488,800, filed on 29 Sep. 2021, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM and U.S. patent application Ser. No. 17/671,881, filed on 15 Feb. 2022, titled SYSTEMS AND METHODS FOR INTELLIGENT CYBER SECURITY THREAT DETECTION AND INTELLIGENT VERIFICATION-INFORMED HANDLING OF CYBER SECURITY EVENTS THROUGH AUTOMATED VERIFICATION WORKFLOWS, which are incorporated herein in their entireties by this reference.

In a second implementation, a system and/or service implementing the method 200 may function to receive a large volume of inbound event data and/or inbound security alert data, which may include a plurality of distinct security alerts and associated security alert data or distinct event data. Thus, in one or more embodiments, S230 may function to extract, distill or otherwise filter security risk feature data from the large volume of inbound event data and/or inbound security alert data (or the plurality of distinct security alerts and security alerts data) to identify a subset of security alerts/events that requires remediation and/or mitigation (e.g., remediation-required security alerts and remediation-required security events). The subset of remediation-required security alerts and/or remediation-required security events may be identified based on one or more automated remediation criteria defined by the automated remediation service.

In one or more embodiments of the first implementation and/or the second implementation, S230 may function to identify the subset of remediation-required security alerts or remediation-required security events of the plurality of security alerts/events based on one or more target alert/event characteristics such as (but not an exhaustive list of), a likely or probable computed threat type of a target system-validated security alert, a likely or probable computed degree of threat severity of a target system-validated security alert (e.g., a likely or probable computed degree of threat severity may be set between any two values in a range, such as a value including and/or between 0 and 100 or A to Z and the like).

For instance, in a non-limiting example, S230 may function to identify the subset of remediation required security alerts or remediation-required security events that requires remediation based on identifying all the validated security events/alerts that exceeds a threat severity threshold (e.g., all validated security events/alerts of a high threat severity level, all validated security events/alerts of a critical threat severity level, etc.).

In another non-limiting example, S230 may function to identify the subset of remediation required security alerts or remediation-required security events that requires remediation based on identifying all the validated security events/alerts of a target cybersecurity threat type (e.g., electronic messaging compromise threat type, phishing threat type, suspicion login threat type, ransomware threat type, malware threat type, etc.).

Figure 12:
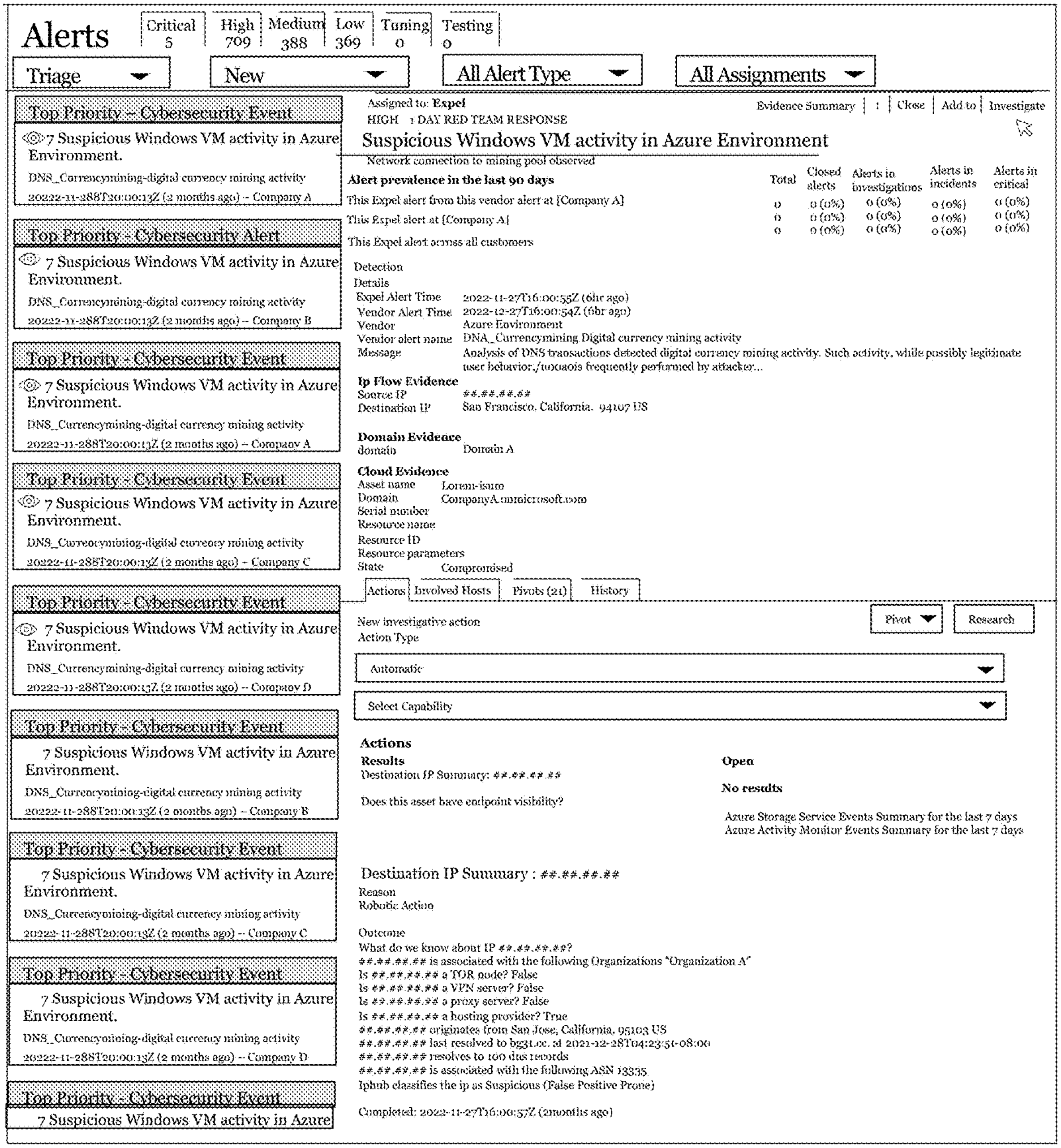
Figure 13:
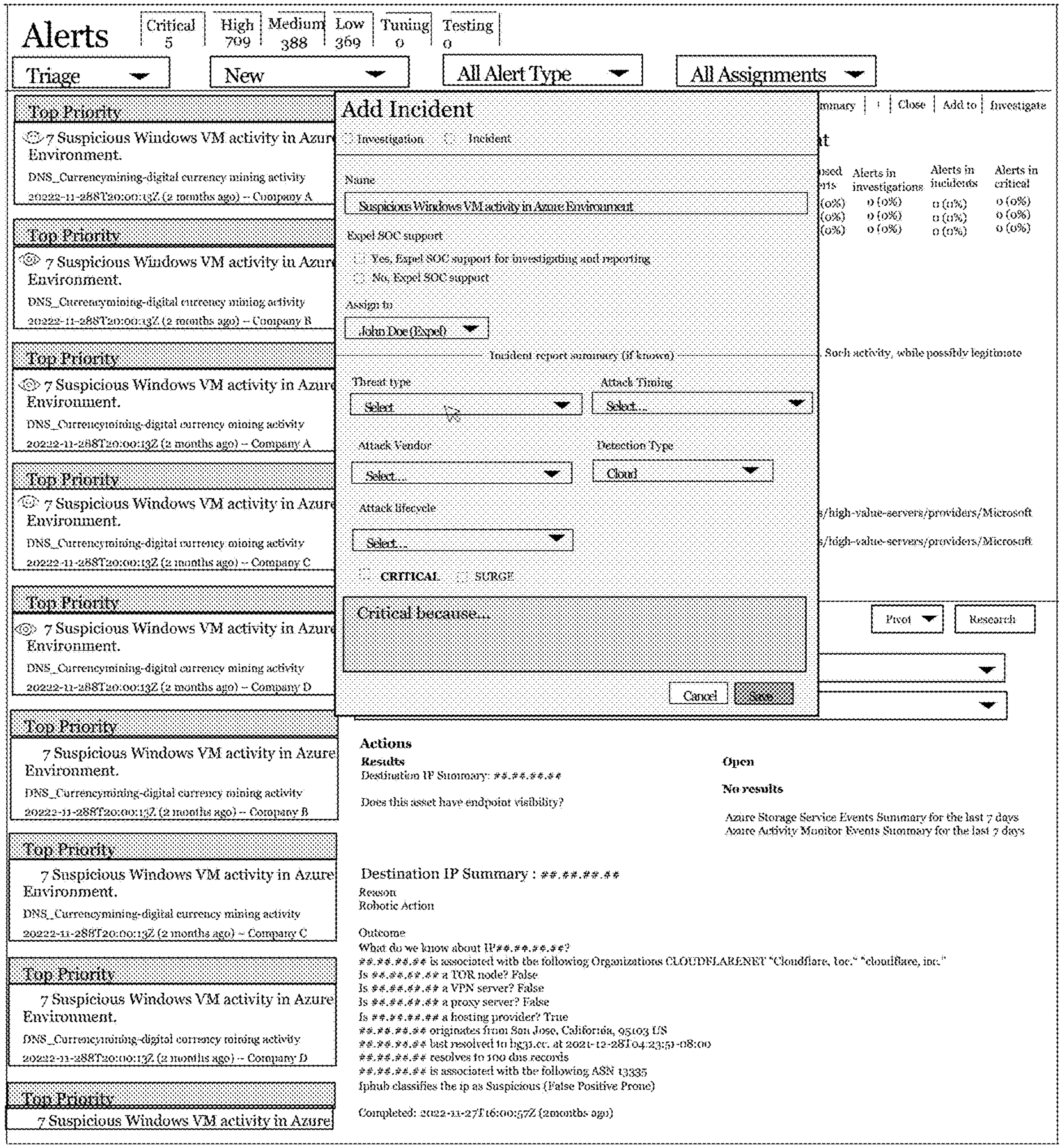
Figure 14:
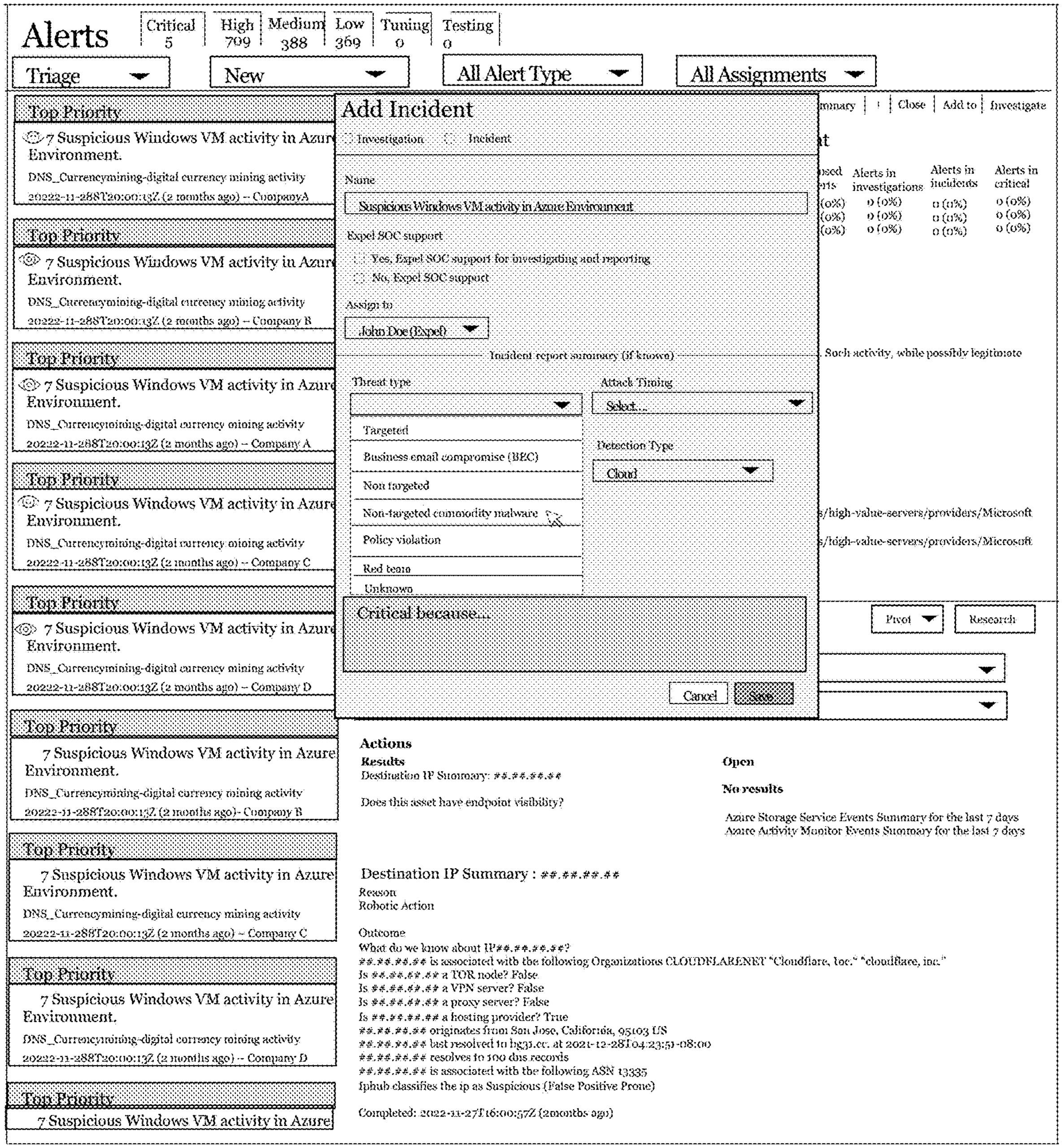
Figure 15:
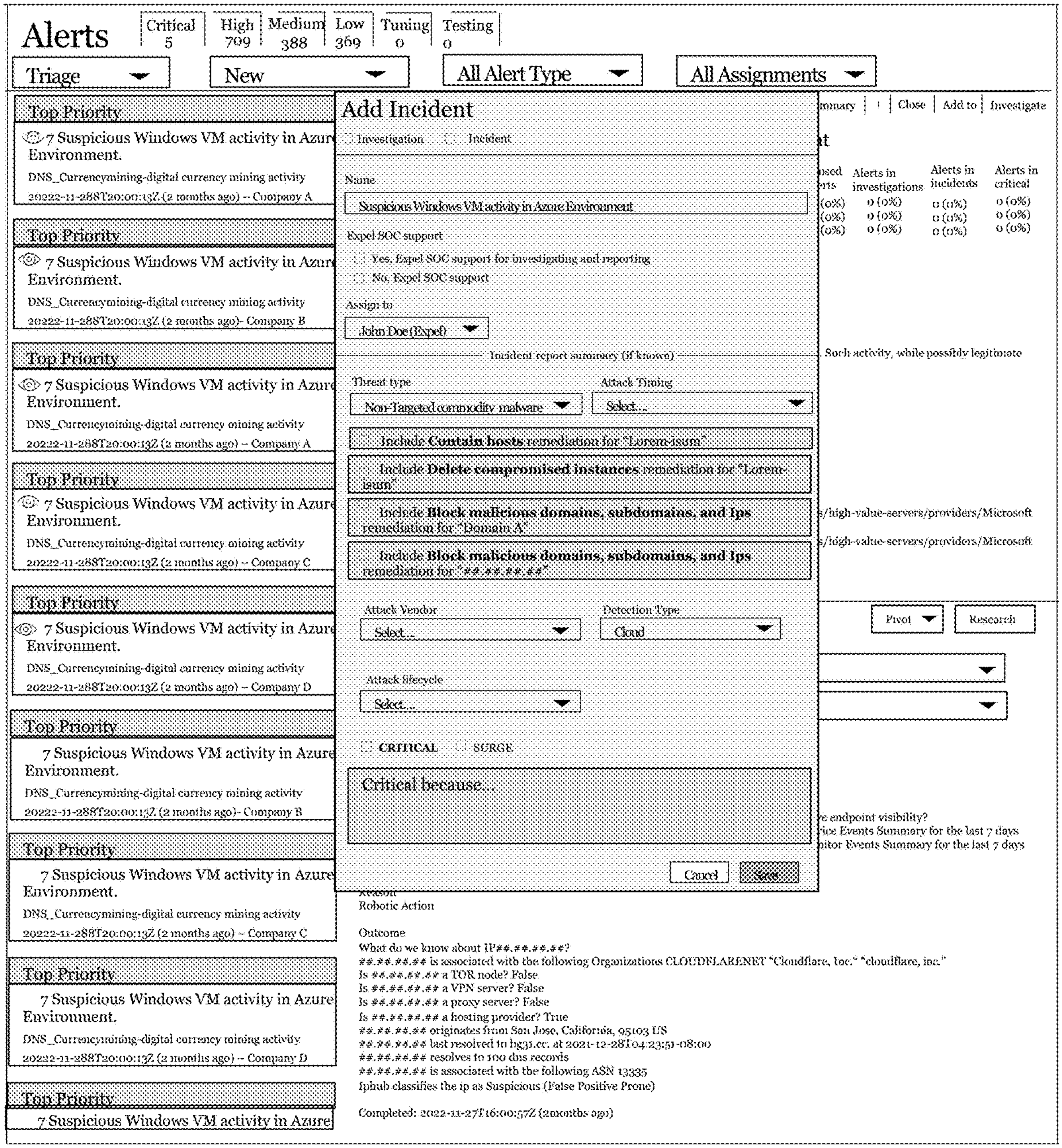

In a third implementation, the cybersecurity event detection and response service may function to display a representation of an event/alert queue on a web-based user interface of the cybersecurity event detection and response service that may be accessible to a subscriber, a security analyst, or the like, as shown generally by way of example in FIG. 12. In such third implementation, the web-based user interface may function to display a plurality of cybersecurity event/alert representations that correspond to a plurality of distinct cybersecurity event/alerts of a plurality of distinct subscribers. Accordingly, based on the cybersecurity event detection and response service, receiving or obtaining, via one or more computers, an input selecting a target cybersecurity event/alert representation of the plurality of distinct cybersecurity event/alert representations, S230 may function to display, via the one or more computers, the cybersecurity alert/event, event metadata, and/or event features that corresponds to the target cybersecurity event/alert representation. It shall be noted that, based on receiving one or more inputs from a subscriber, a security analyst, and/or the like, S230 may function to identify or designate the target cybersecurity event/alert as a remediation-required cybersecurity event/alert based on the one or more inputs causing a creation or construction of a remediation action (or mitigation action) that, when implemented, mitigates a cybersecurity threat associated with the target cybersecurity event/alert, as shown generally by way of example in FIGS. 13-15. It shall be noted that, in one or more embodiments, the cybersecurity event detection and response service may function to automatically propose one or more remediation actions or the like based on a threat type of a target cybersecurity event, and the analyst may function to implement at least a subset of the one or more remediation actions and/or not implement at least a subset of the one or more remediation actions.

In a fourth implementation, the cybersecurity event detection and response service may function to automatically identify remediation-required cybersecurity events and/or remediation-required cybersecurity alerts via on one or more automated workflows specifically configured to identify remediation-required cybersecurity events and/or remediation-required cybersecurity alerts based on service-defined remediation mandatory criteria and/or subscriber-defined remediation mandatory criteria. In such fourth implementation, based on an automatic evaluation of a plurality of distinct cybersecurity events obtained or received by the cybersecurity event detection and response service, S230 may function to selectively identify a subset of remediation-required cybersecurity events in which each cybersecurity event of the subset satisfies service-defined remediation mandatory criteria and/or subscriber-defined remediation mandatory criteria of the one or more automated workflows.

It shall be noted that, in one or more embodiments of the fourth implementation, the service-defined remediation mandatory criteria and/or subscriber-defined remediation mandatory criteria may include one or more of a time-of-day criteria (e.g., the cybersecurity event must have occurred within a predetermined time span (e.g., between 1:00 am and 5:00 am, between non-operating business hours of the subscriber, etc.), the cybersecurity event must exceed a threat severity threshold (e.g., the cybersecurity event is predicted to be of a high threat severity, the cybersecurity event is predicted to be of a critical threat severity, etc.), the cybersecurity event is of a target threat type (e.g., the cybersecurity event relates to a business email compromise (BEC) threat type, the cybersecurity event relates to a subscriber policy violation threat type, etc.).

2.40 Automatically Remediating or Mitigating Remediation-Required Security Alerts or Remediation-Required Security Events S240, which includes automatically remediating or mitigating remediation-required security alerts or remediation-required security events, may function to remediate or mitigate remediation-required security alerts or remediation-required security events via one or more automated remediation actions. In one or more embodiments, S240 may function to configure a subscriber-specific automated remediation action for one or more remediation-required security alerts and/or one or more remediation-required security events and execute the subscriber-specific automated remediation action.

In one or more embodiments, based on a service-generated remediation action being digitally assigned or associated with a target remediation-required cybersecurity event, S240 may function to automatically assess or automatically evaluate the service-generated remediation action against automated remediation criteria of a subscriber to which the target remediation-required cybersecurity event corresponds. In such embodiments, the automatic assessing of the service-generated remediation action against the automated remediation criteria of the subscriber may include one or more of confirming or disconfirming that the threat remediation action type of the service-generated remediation action digitally maps to one of the plurality of distinct automated mitigation action types that the subscriber has enrolled into and confirming or disconfirming that a compromised digital asset included in the service-generated remediation action relates to a remediation-permitted digital asset based on an automatic evaluation of a subscriber-specific remediation context data corpus that corresponds to the one of the plurality of distinct automated remediation action types. Accordingly, S240 may function to automatically construct, via one or more computers, an automated remediation action API request (e.g., a compromised digital asset API request, etc.) based on confirming that the threat remediation action type of the service-proposed threat mitigation action digitally maps to the one of the plurality of distinct automated mitigation action types that the subscriber is enrolled into and confirming that the compromised digital asset relates to a remediation-permitted digital asset based on the automatic evaluation.

In one or more embodiments, automatically constructing, via one or more computers, an automated remediation action API request based on a service-generated remediation action that is associated with a target cybersecurity event may include multiple construction stages. For instance, in one or more embodiments, one of the construction stages may include identifying a security device that corresponds to an origin source of the target cybersecurity event. Additionally, in one or more embodiments, one of the construction stages may include encoding the automated remediation action API request based on API definitions and API protocols of the security device that corresponds to a remediation action type of the service-generated remediation action to which the automated remediation action API request corresponds.

In one or more embodiments, identifying the API definitions and API protocols of the security device that may be used to construct the automated remediation action API request may include one or more of: accessing, via the one or more computers, an API-based reference mapping data structure (e.g., an automated remediation protocol registry or the like) between each of the plurality of distinct automated remediation action types of the cybersecurity event detection and response service and a plurality of distinct security device-specific API definitions and protocols and obtaining, via the one or more processors, the API definitions and protocols of the security device based on evaluating the security device of the target cybersecurity event and the threat mitigation action type of the service-generated threat mitigation action associated with the target cybersecurity event against the API-based reference mapping data structure.

Additionally, or alternatively, in one or more embodiments, identifying the API definitions and API protocols of the security device that may be used to construct the automated remediation action API request may include one or more of: accessing, via the one or more computers, an API-based reference mapping data structure (e.g., an automated remediation protocol registry or the like) between each of the plurality of distinct automated remediation action types of the cybersecurity event detection and response service and a plurality of distinct security device-specific API definitions and protocols and receiving, via the one or more computers, the API definitions and protocols of the security device based on performing a search of the API-based reference mapping data structure using the security device of the cybersecurity event and the threat remediation action type of the service-proposed threat remediation action as search parameters.

Configuring Subscriber-Specific Automated Remediation Actions

Additionally, or alternatively, in another implementation, the automated remediation service may include a web-based security interface or the like that may provide a target subscriber and/or an analyst of the cybersecurity event detection and response service a capability of constructing subscriber-specific automated remediation actions. In one or more embodiments, a subscriber (or analyst) interfacing with the automated remediation service may function to construct an automated remediation action in non-API instructions and the automated remediation service may function to convert the non-API instructions into API instructions when executed.

In operation, one or more user interfaces of the cybersecurity event detection and response service may be designed to enable subscribing users or security analysts of the cybersecurity event detection and response service to intuitively construct remediation actions for one or more validated security alerts requiring remediation. Accordingly, the one or more user interfaces may have a plurality of user interface objects that may be selectable, fillable, or the like and in response to a detection of a subscriber selecting a user interface object or a sequence of user interface objects, the system or service implementing the method 200 may receive a remediation objective of the subscriber or the analyst and, accordingly, digitally assign or digitally associate the remediation objective to a subject cybersecurity event.

For instance, in one or more embodiments, the one or more user interfaces may include one or more distinct selectable objects that, when selected by an analyst or a subscriber, may display a distinct (selectable) menu associated with a distinct stage of a remediation objective. In such instance, the subscriber interface may display a first selectable object that, when selected, may display a plurality of third-party security vendors (e.g., third-party security devices) and the subscriber or analyst may choose one of the plurality of third-party security vendors that corresponds to the source of origination of a target remediation-required security alert(s) or target remediation-required security event(s). That is, in a non-limiting example, the source of origination of a target remediation-required security alert may be from "Vendor X" and S240 may function to detect a subscriber selecting "Vendor X" in response to the subscriber selecting the first selectable object. Additionally, or alternatively, in one or more embodiments, the cybersecurity event detection and response service may function to automatically populate or install into the first selectable object the third-party security vendor data associated with the cybersecurity event to which the remediation objective (e.g., remediation action) corresponds in analogous ways as described in U.S. Patent Application No. 63/351,784, filed on 13 Jun. 2022, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which is incorporated herein in its entirety by this reference.

Additionally, or alternatively, in one or more embodiments, the one or more user interfaces may display a second selectable object that, when selected, may display a list of available automated remediation capabilities of the automated remediations service associated with the selected third-party security vendor of the first selectable interface object. With reference to the above non-limiting example, the subscriber interface may display a second selectable object that, when selected, may display a list of automated remediation capabilities of the automated remediation service corresponding to "Vendor X". Accordingly, the target remediation-required security alert may be from "Vendor X" and S240 may function to detect a subscriber or analyst selecting "host containment" of the list of automated remediation capabilities to appropriately remediate the target remediation-required security alert. Additionally, or alternatively, in one or more embodiments, the cybersecurity event detection and response service may function to automatically populate or install into the second selectable object a service-proposed remediation action type based on a predicted or computed cybersecurity threat of a subject cybersecurity event to which the remediation objective (e.g., remediation action) corresponds.

Additionally, or alternatively, in one or more embodiments, the one or more user interfaces may include a third user interface element that may be configured to receive input data from the subscriber or analyst that may correspond to a subscriber-specific remediation asset (e.g., digital asset, digital resource, or the like) in need of remediation. For instance, in a non-limiting example, the third user interface element may be configured to receive host data (e.g., Host ID) that the subscriber or analyst intends to contain in an environment of a target subscriber. In another non-limiting example, the third user interface element may be configured to receive a malicious hash signature (e.g., potentially malicious hash signature) that the subscriber or analyst intends to block from an environment of a target subscriber. Additionally, or alternatively, in one or more embodiments, the cybersecurity event detection and response service may function to automatically populate or install into the third selectable object the subscriber-specific remediation asset (e.g., digital asset, digital resource, or the like) associated with the cybersecurity event to which the remediation objective (e.g., remediation action) corresponds based on the data included in the second selectable user interface object.

Accordingly, in one or more embodiments, the one or more selections of or inputs to interface objects of the one or more user interfaces may define search parameters and/or an automated remediation data signal that may be used, in part, to form a query to or lookup in the automated remediation registry for discovering API definitions and/or API protocols that may be used to automatically construct, via one or more computers, an automated remediation action API request (e.g., a compromised asset API request or the like) that, when executed, implements or executes a security threat remediation action that mitigates a cybersecurity threat associated with a target remediation-required cybersecurity event (e.g., at-risk or compromised device/application or security vendor, etc.). Additionally, or alternatively, the automated remediation signal may further be used, in part, to instantiate or trigger one or more automated remediation workflows that may automatically create an API-based remediation response based on results of the query or lookup of the automated remediation registry.

It shall be further noted that, in one or more embodiments, the automated remediations service may be accessible to a target subscriber or analyst via any type of web-based medium. For instance, a subscriber or analyst of the cybersecurity event detection and response service may function to communicate or interact with the subscriber interface via a web-based application.

In a variant to the first implementation, S240 may function to instantiate, via one or more computers, an incident summary graphical user interface based on one or more inputs directed to a selectable icon or the like. Accordingly, in response to the cybersecurity event detection and response service identifying a threat type for the cybersecurity event (e.g., based on obtaining a user input selecting non-target commodity malware, etc.), the cybersecurity event detection and response service may function to automatically install, by one or more computers, a plurality of remediation action proposals (e.g., remediation action type+one or more corresponding digital assets and/or one or more digital resources extracted from the corresponding cybersecurity event based on the identified threat type). Furthermore, the analyst may function to implement at least a subset of the one or more remediation actions based on one or more user inputs directed to a target remediation action proposal.

In a second implementation, S240 may function to automatically (or system-generate) subscriber-specific automated remediation actions without the need of a subscriber or analyst to configure an automated remediation action via the subscriber interface. It shall be noted that, in one or more embodiments, S250 may function to reverse a successfully completed and/or a successfully executed automated remediation action that may have been automatically (or system-generated) based on one or more of new investigation findings, subscriber/analyst input, or the results of a cybersecurity investigation conducted for a fast-remediated alert/event (e.g., an inbound alert of a high severity level).

Figure 18:
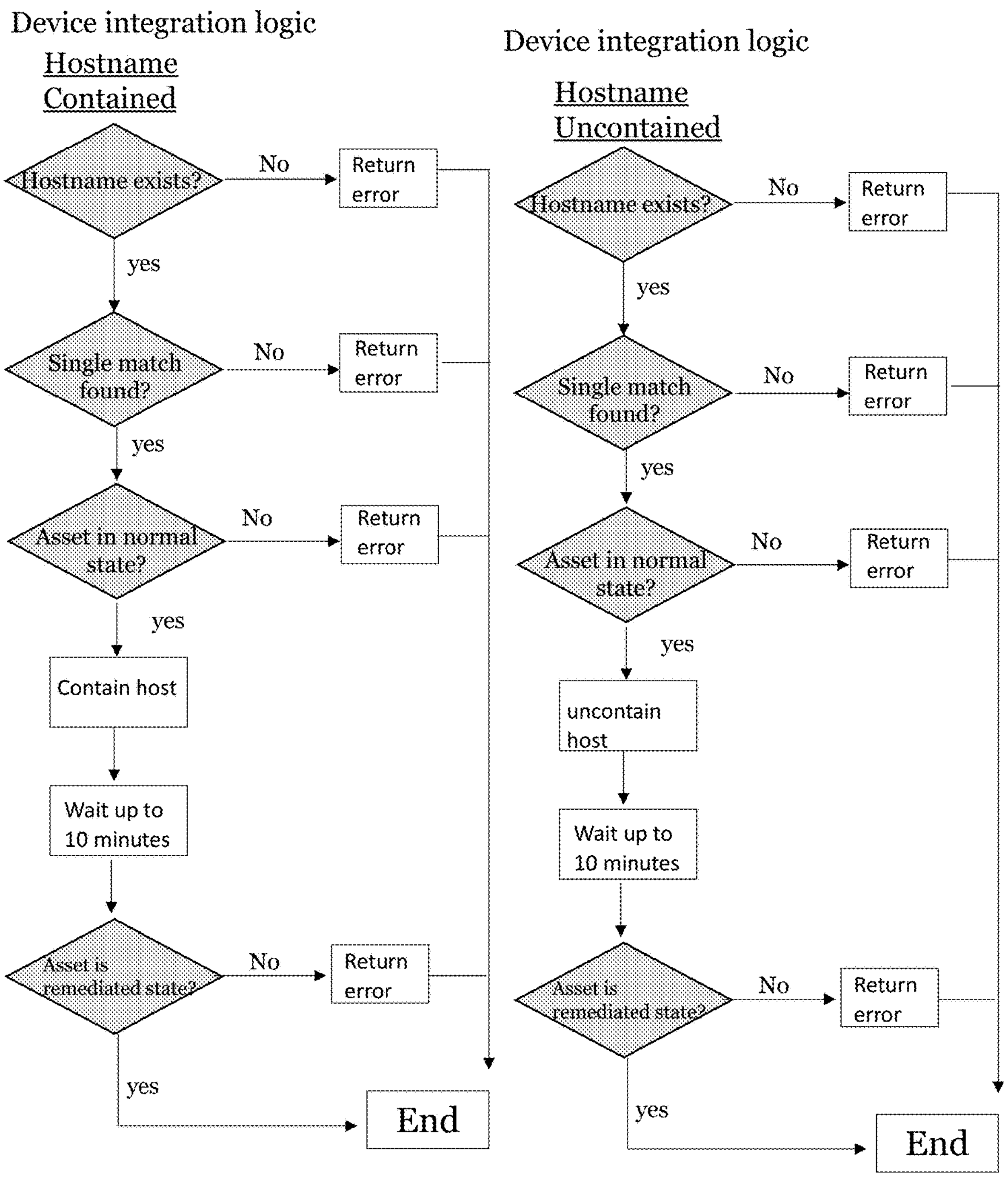
FIG. 18 illustrates a schematic representation of an automated remediation service for automated containing and un-containing hostnames in accordance with one or more embodiments of the present application.

Additionally, or alternatively, it shall be recognized that in some embodiments, S230 may enable a reversal of a given remediation action, as shown generally by way of example in FIG. 18. In one or more embodiments, a target subscriber and/or an analyst of the automated remediation service may execute, via the security interface, one or more remediation action reversals or stops that may operate to terminate an application of an automated remediation action or the like previously executed on an affected device, service account, application, and/or the like. In this way, if a security patch or the like has been deployed to address the target attack vector, a reversal of the remediation action may be required to enable normal functionality of a given service account, application, device, and/or the like.

Executing Subscriber-Specific Remediation Actions

In one or more embodiments, S240 may function to execute one or more subscriber-specific automated remediation action that may function to route the one or more subscriber-specific automated remediation actions to an API arbiter that preferably functions to review each of the one or more subscriber-specific automated remediation requests against a corresponding (e.g., appropriate) subscriber-specific remediation context data structure and translate the non-API instructions of the subscriber-specific automated remediation action to API instructions.

Accordingly, in one or more embodiments, in response to the API arbiter confirming that the remediation asset (e.g., the host ID, the hash signature) may satisfy remediation criterion of an (e.g., appropriate) subscriber-specific remediation context data structure as described above, S240 may function to automatically notify the target subscriber and automatically construct an API call based on the parameters of a subject (constructed) subscriber-specific automated remediation action and the corresponding API definitions and protocols of the automated remediation protocol registry. It shall be noted that via the API arbiter, S240 may function to implement the API arbiter to route each of the plurality of distinct API calls to its corresponding API destination.

Alternatively, in one or more embodiments, in response to the API arbiter disconfirming that the remediation asset (e.g., the host ID, the hash signature, etc.) does not satisfy remediation criterion, the API Arbiter may forego constructing and executing an API call if the remediation attempt of the subscriber-specific automated remediation action interferes with an allowed list or a deny list of the subscriber-specific remediation context data structure, as described above. In such embodiments, S240 may function to notify the target subscriber and recommend (or pose) that the target subscriber preforms a similar (or equivalent) remediation action manually.

It shall be noted that the API arbiter may be integrated with any other suitable system or module described herein.

Exemplarily Applications of Automated Remediations

Figure 17:
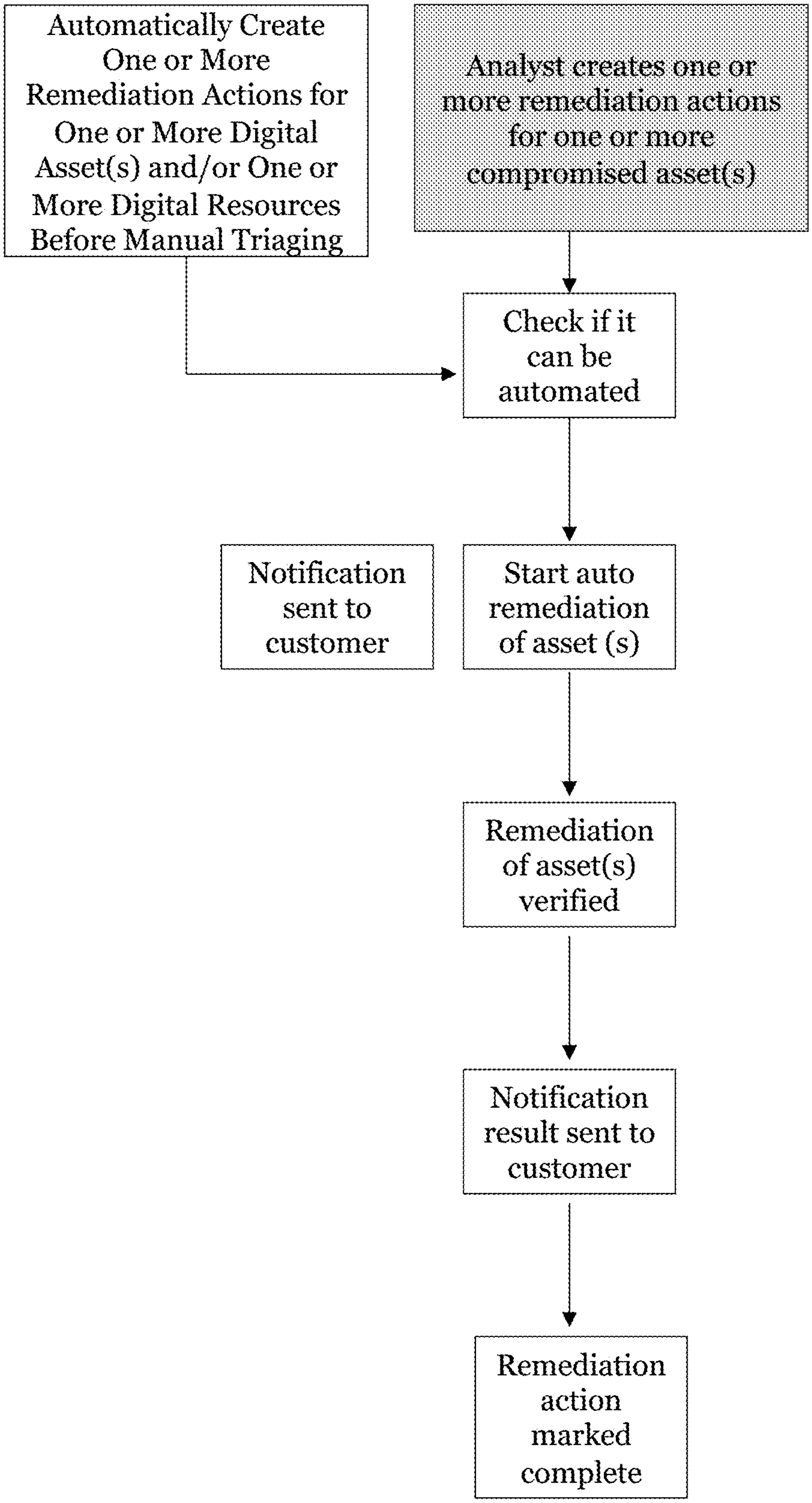
FIG. 17 illustrates a schematic representation of an automated remediation service in accordance with one or more embodiments of the present application.

In one or more embodiments, the cybersecurity event detection and response service (e.g., the system 100 implementing the method 200) may function to identify a cybersecurity event associated with a third-party security application or a third-party security service of a subscriber; generate a service-proposed threat mitigation action for the cybersecurity event based on identifying that the cybersecurity event corresponds to malicious activity, wherein the service-proposed threat mitigation action may include a threat mitigation action type and a compromised digital asset associated with the cybersecurity event; automatically assess the service-proposed threat mitigation action against automated mitigation criteria of the subscriber based on the generation of the service-proposed threat mitigation action, wherein the automatic assessing confirms or disconfirms that the threat mitigation action type and the compromised digital asset satisfies the automated mitigation criteria of the subscriber; automatically construct a compromised asset application programming interface (API) request based on confirming that the threat mitigation action type and the compromised digital asset satisfies the automated mitigation criteria of the subscriber, wherein the automated construction of the compromised asset API request includes: identifying a security device associated with an origin source of the cybersecurity event and encoding the compromised asset API request based on API definitions and protocols of the security device that corresponds to the threat mitigation action type; and automatically execute the compromised asset API request that resolves or mitigates a cybersecurity threat associated with the compromised digital asset at the third-party security application or the third-party security service, as shown generally by way of example in FIG. 17.

In a non-limiting example of such embodiments, the threat mitigation action type of the service-proposed threat mitigation action may relate to terminating existing network connections associated with a target compromised network host and preventing new network connections from digitally communicating with the target compromised network host; the compromised digital asset of the service-proposed threat mitigation action may include a compromised network host of the subscriber; constructing the compromised asset API request may include encoding a payload component of the compromised asset API request to include the compromised network host of the subscriber; and the compromised asset API request, when executed, may automatically terminate existing network connections on the compromised network host and prevent new network connections from digitally communicating with the compromised network host of the subscriber, as shown generally by way of example in FIG. 18.

In another non-limiting example of such embodiments, the threat mitigation action type of the service-proposed threat mitigation action may relate to temporarily or permanently disabling a target compromised user account to prevent unauthorized access to a target computing environment of a target subscriber; the compromised digital asset of the service-proposed threat mitigation action may include a compromised user account of the subscriber; constructing the compromised asset API request may include encoding a payload component of the compromised asset API request to include the compromised user account of the subscriber; and the compromised asset API request, when executed, may automatically disable the compromised user account of the subscriber.

In another non-limiting example of such embodiments, the threat mitigation action type of the service-proposed threat mitigation action may relate to terminating a target cloud computing environment of a target subscriber; the compromised digital asset of the service-proposed threat mitigation action may include a compromised cloud computing environment of the subscriber; constructing the compromised asset API request may include encoding a payload component of the compromised asset API request to include the compromised cloud computing environment of the subscriber; and the compromised asset API request, when executed, may automatically suspend or automatically cease digital events from occurring on the compromised cloud computing environment of the subscriber.

In another non-limiting example of such embodiments, the threat mitigation action type of the service-proposed threat mitigation action may relate to disabling or modifying a target compromised cloud access key of a target subscriber; the compromised digital asset of the service-proposed threat mitigation action may include a compromised access key of the subscriber; constructing the compromised asset API request includes encoding a payload component of the compromised asset API request to include the compromised cloud access key of the subscriber; and the compromised asset API request, when executed, may automatically disable or automatically modify the compromised access key of the subscriber.

In one or more embodiments, the cybersecurity event detection and response service (e.g., the system 100 implementing the method 200) may function to identify, via one or more processors, a cybersecurity event associated with a third-party application or a third-party service of a subscriber; generate, via the one or more processors, a service-proposed remediation action for the cybersecurity event based on the identifying of the cybersecurity event; automatically assess, via the one or more processors, the service-proposed remediation action against automated remediation criteria of the subscriber based on the generation of the service-proposed remediation action; automatically construct, via the one or more processors, a remediation action application programming interface (API) request for the service-proposed remediation action based on the service-proposed remediation action satisfying the automated remediation criteria of the subscriber; and automatically execute, via the one or more processors, the remediation action API request to remediation or mitigate a suspected cybersecurity threat associated with the cybersecurity event.

In a non-limiting example of such embodiments, a remediation action type of the service-proposed remediation action may relate to deleting or removing a target malicious electronic communication from a majority of the electronic messaging accounts associated with a target subscriber; the service-proposed threat remediation action may include a malicious electronic communication identified during a cybersecurity investigation of the cybersecurity event; constructing the remediation action API request may include encoding a payload component of the remediation action API request to include a representation of the malicious electronic communication of the subscriber; and the remediation action API request, when executed, may automatically delete or automatically remove the malicious electronic communication from a majority of the electronic messaging accounts associated with the subscriber of the cybersecurity event.

In another non-limiting example of such embodiments, a remediation action type of the service-proposed remediation action may relate to blocking a target domain or internet protocol address corresponding to a target command-and-control communication; the service-proposed remediation action may include a command-and-control communication identified during a cybersecurity investigation of the cybersecurity event; and the remediation action API request, when executed, may automatically block, for the subscriber, one or more internet protocol addresses or one or more domains associated with the command-and-control communication.

In another non-limiting example of such embodiments, a remediation action type of the service-proposed remediation action may relate to preventing a target malicious application associated with a target malicious hash signature from executing on a target digital environment of a target subscriber; the service-proposed remediation action may include a malicious hash signature identified during a cybersecurity investigation of the cybersecurity event; constructing the remediation action API request for the service-proposed remediation action may include encoding a payload component of the remediation action API request to include the malicious hash signature; and the remediation action API request, when executed, may automatically block the malicious hash signature for the subscriber.

2.45 Surfacing Automated Remediation Actions

Figure 7:
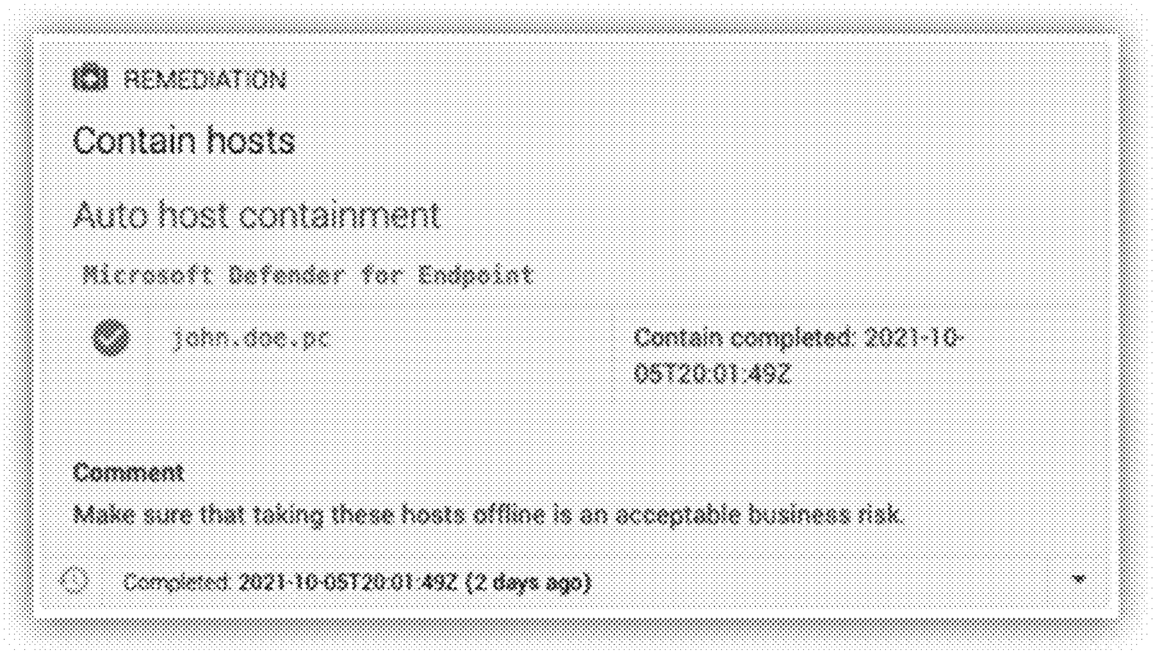
FIG. 7 illustrates an example representation of an automated remediation graphic or tile in accordance with one or more embodiments of the present application.

Optionally, S245, which includes surfacing automated remediation actions, may function to surface or display one or more automated remediation actions and a corresponding status to a target subscriber via the security threat mitigation user interface 130. In one or more embodiments, in response to executing an API call (e.g., a compromised digital asset API request, an automated remediation action API request, etc.), S250 may function to simultaneously or contemporaneously, display an automated remediation graphic (or tile) that includes one or more pieces of remediation action data and a status of the remediation action (e.g., created, completed, failed) on the security threat mitigation user interface 130, as shown by way of example in FIG. 7.

Figure 16:
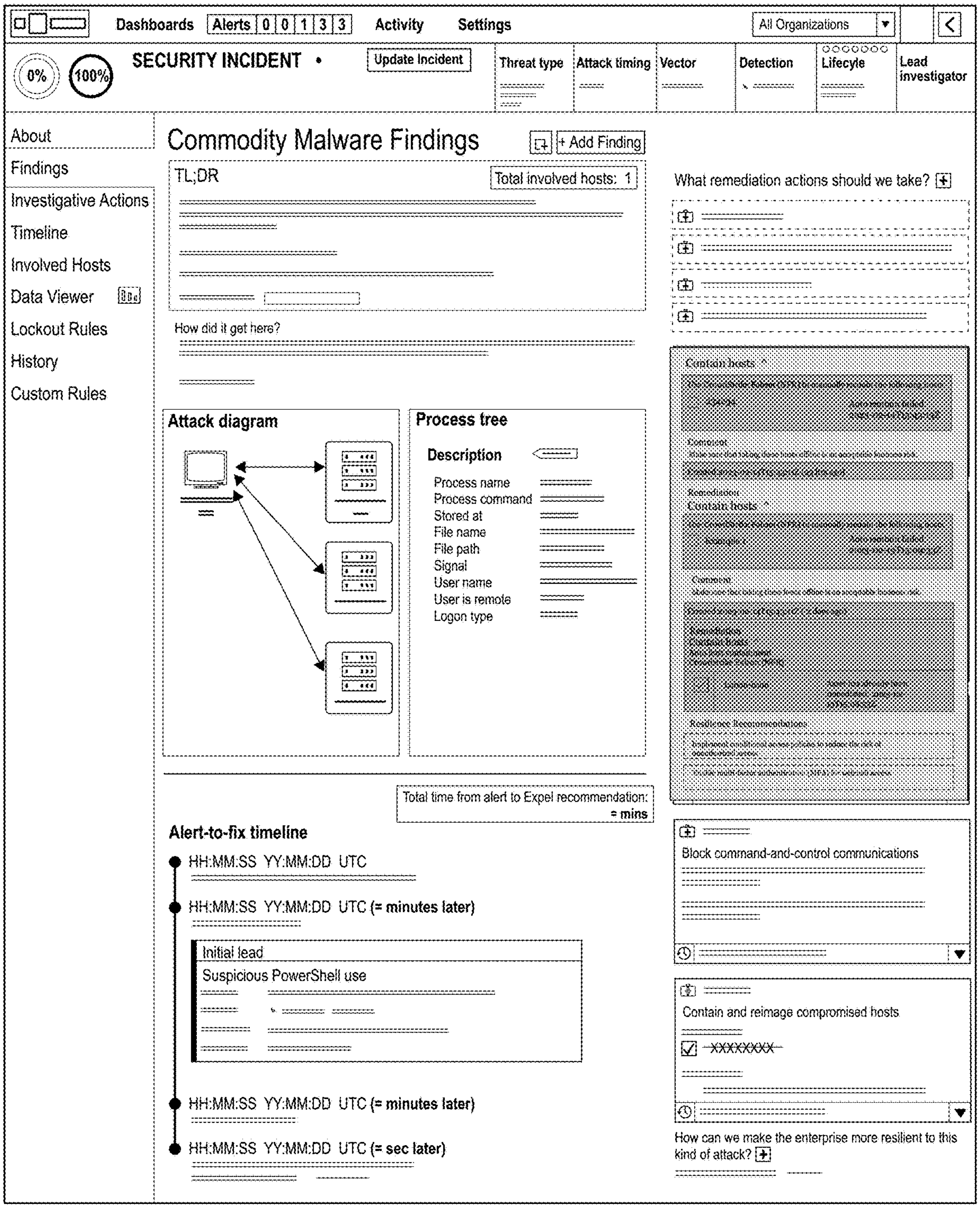

In one or more embodiments, based on or in response to generating a service-proposed remediation action (e.g., a service-generated remediation action or the like) for a target cybersecurity event, S245 may function to automatically construct a cybersecurity event-specific reporting artifact that may include a remediation-based graphical user interface object that corresponds to the service-proposed remediation action, as described in U.S. patent application Ser. No. 17/591,185, filed on 2 Feb. 2022, titled SYSTEMS AND METHODS FOR CYBERSECURITY THREAT DETECTION AND EXPEDITED GENERATION OF INVESTIGATION STORYBOARDS USING INTELLIGENT CYBER SECURITY AUTOMATIONS, which is incorporated herein in its entirety by this reference. Accordingly, in such embodiments, via the one or more computers, S245 may function to install a remediation status (e.g., created, completed, failed, or the like) and/or a remediation time into a target portion of the remediation-based graphical user interface object based on an outcome or result of the executing of the remediation action API request, as shown generally by way of example in FIG. 16.

It shall be noted that, in one or more embodiments, S250 may function to re-route an (attempted) automated remediation action to a target subscriber based on the (attempted) automated remediation action being in a pending state for a period of time greater than a service-defined temporal threshold (e.g., 60 minutes). In such embodiments, S250 may function to notify the target subscriber that the (attempted) automated remediation action was unsuccessful and propose that the target subscriber manually performs one or more analogous remediation actions associated with the automated remediation action.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A computer-implemented method comprising:

receiving a remediation action for a security event based on determining the security event corresponds to suspicious activity, wherein the remediation action includes (i) a remediation action type and (ii) a digital asset associated with the security event;

constructing an application programming interface request for the remediation action based on confirming the remediation action type and the digital asset satisfies automated remediation criteria;

after receiving the remediation action:

automatically generating an event reporting artifact that includes a remediation graphical user interface object, wherein the remediation graphical user interface object includes the remediation action; and providing a remediation status of the application programming interface request within the remediation graphical user interface object; and executing the application programming interface request that resolves or mitigates a security threat associated with the digital asset.

2. The computer-implemented method according to claim 1, wherein:

the remediation action type of the remediation action relates to temporarily or permanently disabling a target user account, the digital asset of the remediation action includes a user account of a subscriber associated with the security event, the application programming interface request includes the user account of the subscriber, and the application programming interface request, when executed, disables the user account of the subscriber.

3. The computer-implemented method according to claim 1, wherein:

the digital asset of the remediation action includes a network host, the application programming interface request includes the network host, and the application programming interface request, when executed, terminates existing network connections and prevents new network connections on the network host.

4. A method comprising:

at a cybersecurity service:

enrolling a subscribing entity into a plurality of distinct automated remediation action types provided by the cybersecurity service in response to receiving one or more enrollment requests from the subscribing entity;

generating a remediation task based on obtaining a digital event associated with the subscribing entity, wherein the remediation task includes (i) a remediation action type and (ii) a compromised digital asset associated with the digital event;

constructing a compromised asset application programming interface (API) request based on confirming the remediation action type and the compromised digital asset satisfies automated remediation criteria;

after generating the remediation task:

automatically generating an event reporting artifact that includes a remediation graphical user interface object, wherein the remediation graphical user interface object includes the remediation task; and providing a remediation status of the compromised asset API request within the remediation graphical user interface object; and executing the compromised asset API request that resolves or mitigates a threat associated with the compromised digital asset.

5. The method according to claim 4, further comprising:

during an enrollment of the subscribing entity to one of the plurality of distinct automated remediation action types:

obtaining, from the subscribing entity, a corpus of prohibited digital assets on which the subscribing entity prohibits the cybersecurity service to execute automated remediation actions associated with the one of the plurality of distinct automated remediation action types.

6. The method according to claim 4, further comprising:

during an enrollment of the subscribing entity to one of the plurality of distinct automated remediation action types:

obtaining, from the subscribing entity, a corpus of authorized digital assets on which the subscribing entity permits or authorizes the cybersecurity service to execute automated remediation actions associated with the one of the plurality of distinct automated remediation action types.

7. A computer-implemented method comprising:

receiving a remediation action for a security alert, wherein the remediation action includes (i) a remediation action type and (ii) a digital asset associated with the security alert;

constructing an application programming interface request for the remediation action based on confirming the remediation action type and the digital asset satisfies automated remediation criteria;

after receiving the remediation action:

automatically generating an incident reporting artifact that includes a remediation graphical user interface object, wherein the remediation graphical user interface object includes the remediation action; and providing a remediation status of the remediation action within the remediation graphical user interface object; and executing the application programming interface request that resolves or mitigates a security threat associated with the digital asset.

* * * * *